(12) United States Patent
Patterson et al.

(10) Patent No.: US 11,457,303 B2
(45) Date of Patent: Sep. 27, 2022

(54) COMPUTING DEVICE

(71) Applicant: Lenovo (Singapore) Pte. Ltd., Singapore (SG)

(72) Inventors: Samuel Jackson Patterson, Raleigh, NC (US); Cuong Huy Truong, Cary, NC (US); Kazuo Nakada, Yokohama (JP); Hisashi Shima, Yokohama (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 8 days.

(21) Appl. No.: 17/100,617

(22) Filed: Nov. 20, 2020

(65) Prior Publication Data

US 2022/0167074 A1   May 26, 2022

(51) Int. Cl.
| | |
|---|---|
| *H04R 1/10* | (2006.01) |
| *H04W 76/10* | (2018.01) |
| *H05K 5/00* | (2006.01) |
| *G06F 1/16* | (2006.01) |
| *G06F 3/02* | (2006.01) |

(52) U.S. Cl.
CPC ......... *H04R 1/1041* (2013.01); *G06F 1/1624* (2013.01); *G06F 3/0202* (2013.01); *H04R 1/1016* (2013.01); *H04R 1/1025* (2013.01); *H04W 76/10* (2018.02); *H05K 5/0017* (2013.01); *H04R 2420/05* (2013.01); *H04R 2420/07* (2013.01)

(58) Field of Classification Search
CPC ... H04R 1/1041; H04R 1/1016; H04W 76/10; G06F 1/1624; G06F 3/0202
See application file for complete search history.

(56) References Cited

U.S. PATENT DOCUMENTS

| | | | |
|---|---|---|---|
| 2004/0063456 A1* | 4/2004 | Griffin | H04B 1/3877 455/550.1 |
| 2006/0245585 A1* | 11/2006 | Yin | G06F 1/1688 379/430 |
| 2007/0279852 A1* | 12/2007 | Daniel | G06F 1/163 361/679.03 |
| 2009/0029734 A1* | 1/2009 | Syed | H04B 1/3877 455/557 |
| 2013/0238829 A1* | 9/2013 | Laycock | H04R 1/1033 710/303 |
| 2015/0365756 A1* | 12/2015 | Merenda | A45C 15/00 381/375 |
| 2016/0173160 A1* | 6/2016 | Gronewoller | H04B 1/3883 455/575.8 |
| 2018/0091884 A1* | 3/2018 | Minoo | H04R 1/1091 |
| 2019/0129473 A1* | 5/2019 | Hu | G06F 1/1643 |

* cited by examiner

*Primary Examiner* — Simon King
(74) *Attorney, Agent, or Firm* — Brian J. Pangrle

(57) ABSTRACT

A device can include a processor; memory accessible to the processor; a housing assembly that includes a display and a tray recess; and an ear bud tray disposed in the tray recess.

13 Claims, 17 Drawing Sheets

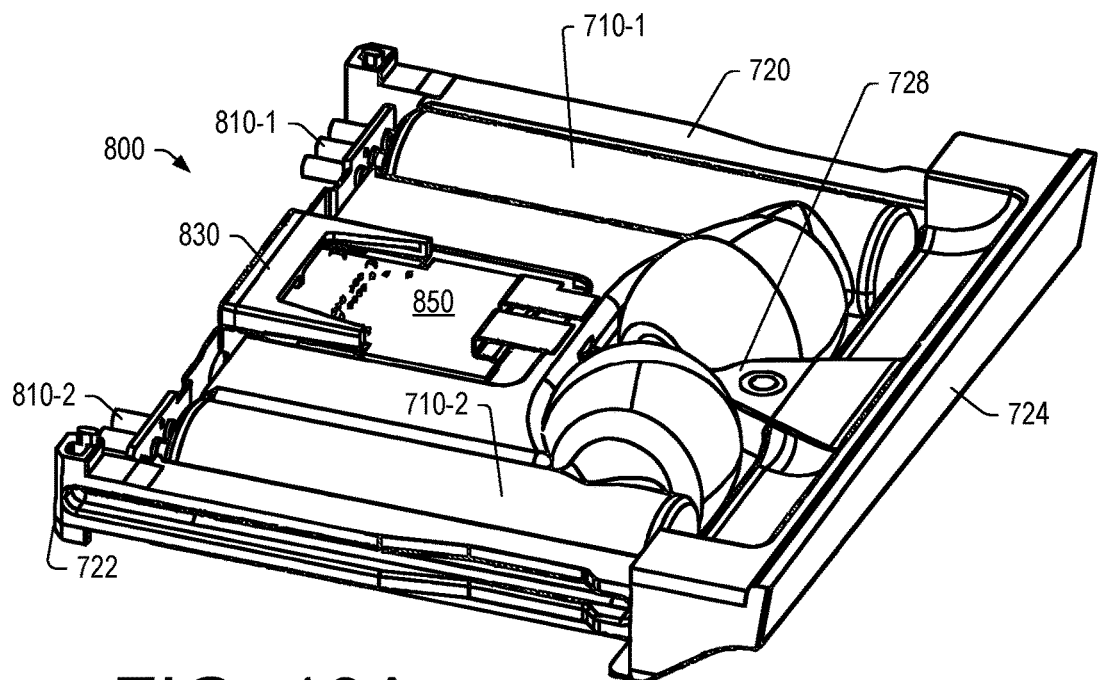
FIG. 10A
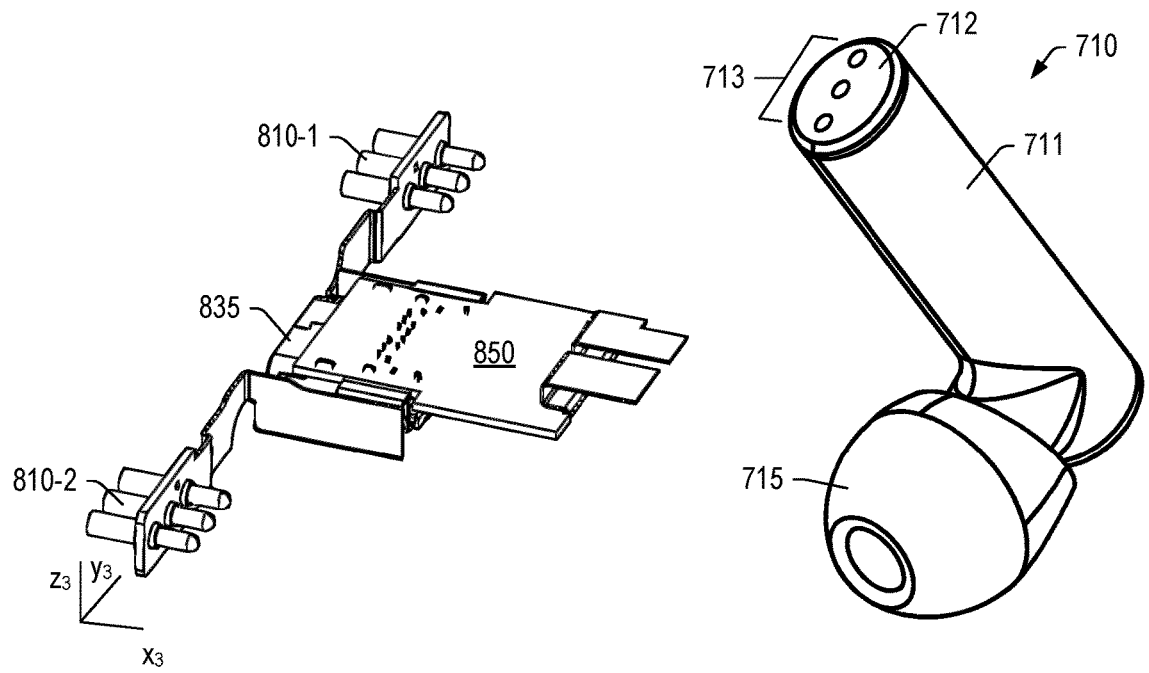
FIG. 10B
FIG. 10C

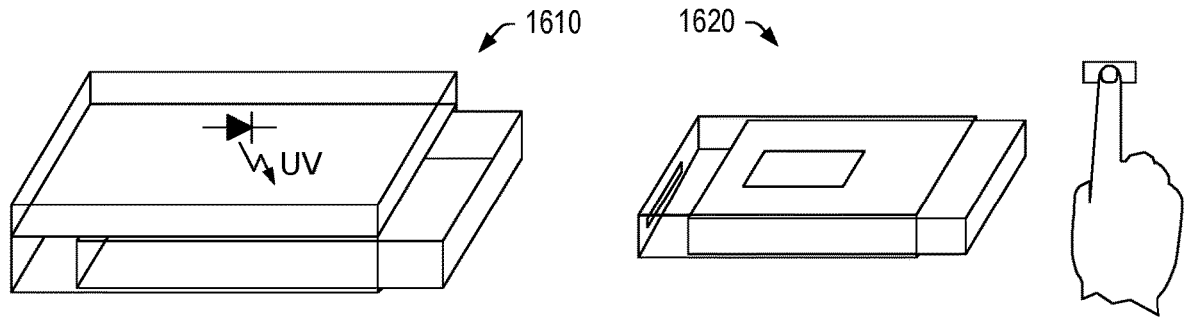
FIG. 16A
FIG. 16B
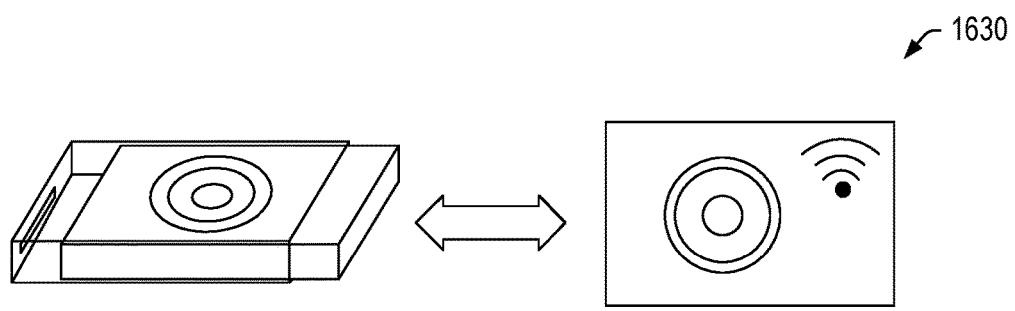
FIG. 16C
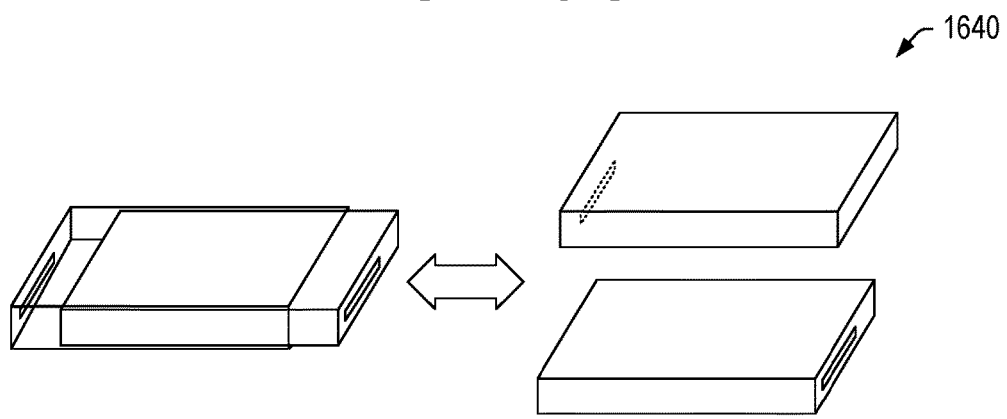
FIG. 16D

COMPUTING DEVICE

TECHNICAL FIELD

Subject matter disclosed herein generally relates to technology for computing or other devices.

BACKGROUND

Various types of devices, display devices, computing and display devices, etc., can include one or more housings.

SUMMARY

A device can include a processor; memory accessible to the processor; a housing assembly that includes a display and a tray recess; and an ear bud tray disposed in the tray recess. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

FIG. 10A, FIG. 10B, and FIG. 10C are diagrams of examples of a component, circuitry, and wireless earphones;
FIG. 16A, FIG. 16B, FIG. 16C and FIG. 16D are diagrams of examples of components.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
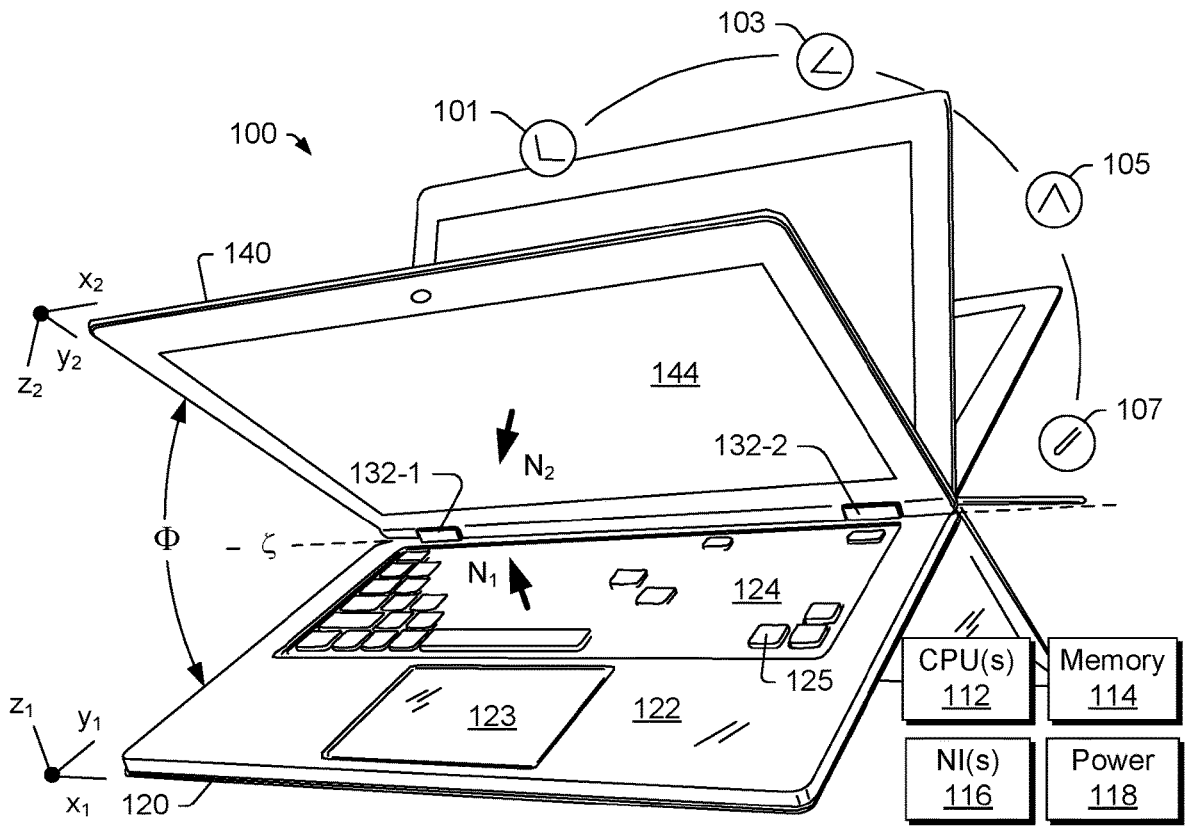
FIG. 1 is a diagram of an example of a device.
Figure 1:
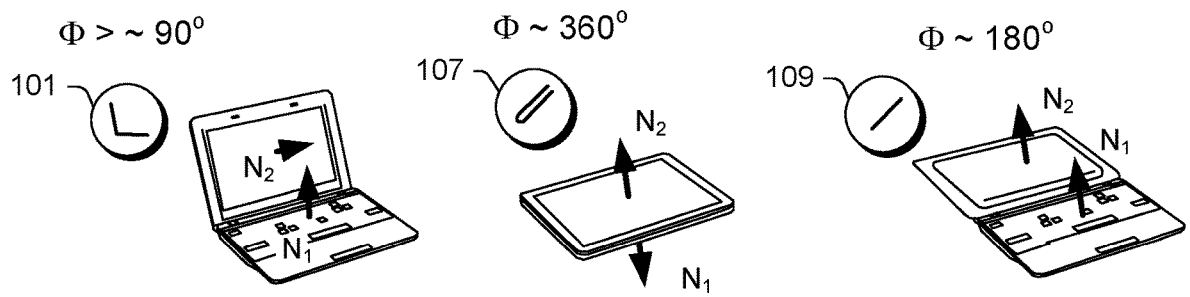
Figure 1:
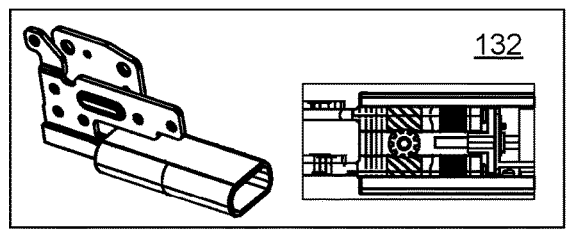

FIG. 1 shows an example of a device 100 that includes a keyboard housing 120 and a display housing 140 that are pivotable with respect to each other via movement about one or more hinges 132-1 and 132-2 (e.g., hinge assemblies such as a hinge assembly 132, etc.). The device 100 may be referred to as a computing device and may be a system such as, for example, a computing system (e.g., an information handling device, an information handing system, etc.).

As an example, the device 100 may include one or more processors 112, memory 114 (e.g., one or more memory devices), one or more network interfaces 116, and one or more power cells 118. Such components may be, for example, housed within the keyboard housing 120, the display housing 140, or the keyboard housing 120 and the display housing 140.

As shown in the example of FIG. 1, the keyboard housing 120 includes a keyboard 124 with keys 125 and the display housing 140 includes a display 144. In such an example, the keyboard 124 is defined in a first Cartesian coordinate system as having a width along an x-axis ($x_1$), a depth along a y-axis ($y_1$) and a height or thickness along a z-axis ($z_1$) that extends in a direction outwardly away from touch surfaces of keys 125 of the keyboard 124 and the display 144 is defined in a second Cartesian coordinate system as having a width along an x-axis ($x_2$), a depth along a y-axis ($y_2$) and a height or thickness along a z-axis ($z_2$) that extends in a direction outwardly away from a viewing surface of the display 144. As an example, a coordinate system may be right-handed or left-handed. In various examples, a footprint may be defined by an area such as an area in an x,y-plane.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as the axis $\zeta$ and an angle $\Phi$ about the axis $\zeta$. Where a hinge assembly includes two axles, an axis may be defined, for example, by an intersection of a first housing plane and a second housing plane.

FIG. 1 shows some examples of orientations 101, 103, 105, 107 and 109. The orientations 101, 103, 105, 107 and 109 may correspond to orientations of a clamshell computing system. The orientation 101 may be a notebook orientation where the angle $\Phi$ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 144 of the display housing 140 (e.g., using the one or more processors 112, the memory 114, etc. that may be included in the keyboard housing 120, the display housing 140 or both).

As an example, the keyboard housing 120 may include a frontal surface 122 and may include a touch input surface 123 (e.g., of a touch input device such as a touchpad that includes touch sensing circuitry). As an example, the keyboard 124 may include one or more other input devices (e.g., a control stick, etc.). As an example, the frontal surface 122 may be a surface suitable for resting a palm or palms of a hand or hands. As an example, where a touch sensing surface is at or overlapping a palm rest, palm rejection circuitry may be utilized (see, e.g., the example of FIG. 15, etc.). As shown in FIG. 1, the touch input surface 123 can be defined by x and y dimensions where a left palm rest surface is to the left of the touch input surface 123 and where a right palm rest surface is to the right of the touch input surface 123. In such an example, the left and right palm rest surfaces may be defined by respective x and y dimensions as well as a spacing therebetween. Where a device does not include a touch input surface such as the touch input surface 123, the frontal surface 122 may extend in the x direction approximately from a left side of the keyboard housing 120 to a right side of the keyboard housing. Such a surface can be a left and right palm rest surface.

A palm rest surface can allow a user to rest a palm or palms while the user may type (e.g., touch type) using keys of a keyboard that is part of a keyboard housing. For example, a user can rest a palm on a palm rest surface while using one or more finger tips (e.g., or finger pads) to touch keys to thereby instruct a computing system to receive input instructions. In such an example, the keys of the keyboard may be depressible keys. A depressible key may include a spring mechanism that allows the key to be, responsive to finger applied force, depressed a distance in the z direction of the Cartesian coordinate system of a keyboard housing to a level that may be a maximum depression level where, upon release of the force, the key may then return to an undepressed level.

As to the orientation 103, it may correspond to a display orientation for viewing the display 144 where the keyboard 124 faces downward and the device 100 is supported by the keyboard housing 120 (e.g., by a rim or bezel about the keyboard 124, the frontal surface 122, etc.). As to the orientation 105, it may correspond to a "tent" orientation where the display 144 faces outwardly for viewing on one side of the tent and the keyboard 124 of the keyboard housing 120 faces outwardly on the other side of the tent.

The orientation 107 may be a tablet orientation where the angle $\Phi$ is about 360 degrees such that a normal outward vector $N_1$ of the keyboard 124 of the keyboard housing 120 (e.g., normal to an $x_1,y_1$-plane) and a normal outward vector $N_2$ of the display 144 of the display housing 140 (e.g., normal to an $x_2,y_2$-plane) are oriented in oppositely pointing directions, pointing away from each other; whereas, in contrast, for a closed orientation of the device 100 (e.g., where the angle $\Phi$ is about 0 degrees), the vectors $N_1$ and $N_2$ would be pointing toward each other.

As an example, the device 100 may include a swivel hinge, which may be centrally located where a user may spin the keyboard housing by 180 degrees about a central axis of the swivel hinge (e.g., an axis orthogonal to the axis $\zeta$) and then rotate the keyboard housing such that the keys face the back side of the display in a folded orientation. In such an example, a single centrally located hinge provides symmetry such that a computing device can be aligned in a closed clamshell orientation and a tablet orientation, optionally with the keys of the keyboard housing facing the back side of a display of a display housing.

The orientation 109 may be a planar orientation where the angle $\Phi$ is about 180 degrees such that a normal outward vector $N_1$ of the keyboard 124 of the keyboard housing 120 and a normal outward vector $N_2$ of the display 144 of the display housing 140 are oriented in approximately the same pointing directions.

FIG. 1 also shows an example of a hinge assembly 132 that can include leafs or saddles, gears, axles, a tension mechanism, nuts and a tensioning component. As an example, one saddle may be coupled to the housing 120 and another saddle may be coupled to the housing 140. As an example, a hinge assembly may include two gears with an intermediate gear (e.g., an idler gear) that mesh the two gears. In such an example, three axles may be provided where the two gears are on parallel axles and the intermediate gear is on an axle that is orthogonal to a plane defined by the parallel axles. As an example, a hinge assembly may be a single axle hinge assembly where, for example, saddles extend from the single axle for coupling to two housings.

Various computing devices such as laptop or notebook computing devices can be characterized at least in part by a footprint. For example, the device 100 of FIG. 1 may be characterized at least in part by dimensions in x and y as to the keyboard housing 120 and/or as to the display housing 140. As an example, a footprint can be an area that can be defined by a plane in the x and y directions of the Cartesian coordinate systems shown in FIG. 1.

Figure 2:
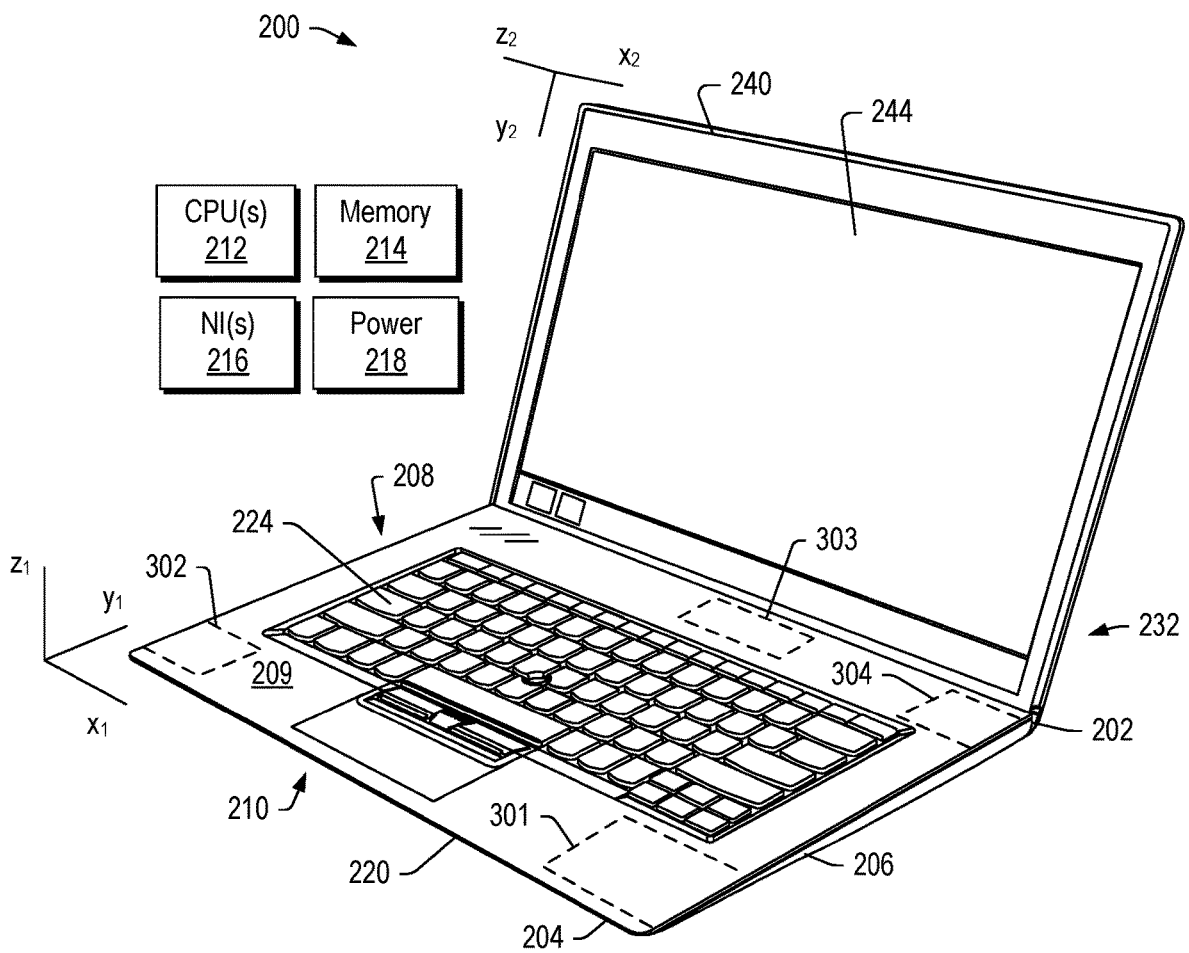
FIG. 2 is a diagram of an example of a device.

FIG. 2 shows an example of a device 200 that includes various features of the device 100 of FIG. 1 where various examples of one or more recesses 301, 302, 303 and 304 are shown. As an example, a tray can be received at least in part in a recess and, for example, a device can include one or more trays, which may be received at least in part in one or more recesses. As an example, a tray may be a separate piece and/or a molded part of a shell, a chassis, etc. As an example, a tray may be a fixed tray, a movable tray, a removable tray, etc. For example, a fixed tray may be part of a shell, a chassis, etc., that forms other features of a device (e.g., a keyboard bezel, etc.); a movable tray may be movable with respect to one or more features (e.g., rails, tracks, etc.), where, for example, the movable tray is to remain operatively coupled to a device; and a removable tray may or may not be a movable tray that can be separated from a device. As an example, a removable tray may be interference fit or otherwise fit with respect to a recess. As to a movable and removable tray, a tray may translate and then be removable. For example, consider a tray as a drawer that can be translated and/or rotated outwardly from a recess and then be removed (e.g., removed from a translation and/or rotation mechanism, etc.). As an example, a removable tray can include one or more features that provide for use independent of a device. For example, consider a removable tray that includes one or more wired and/or wireless interfaces, which may be for charging, transmission of data, reception of data, etc. As an example, a tray can receiving one or more components such as, for example, an ear bud or ear buds, a storage device, a biometric device, a camera, security circuitry, a removable light, etc.

As shown in FIG. 2, the device 200 includes a keyboard housing 220 and a display housing 240 that are pivotable with respect to each other via movement about one or more hinges 232 (e.g., one or more hinge assemblies). The device 200 may be a device such as, for example, a computing device (e.g., an information handling device). As shown, the keyboard housing 220 includes a keyboard 224 (e.g., with typewriter keys) and the display housing 240 includes a display 244, which may be a touch-sensitive display, a digitizer display operable using a stylus, etc.

In the example of FIG. 2, the device 200 includes a hinge assembly side 202, a front side 204, a right side 206, a left side 208, a keyboard side 209 (e.g., a front or top side) and a bottom side 210. An area defined by the sides 202, 204, 206 and 208 can be a footprint; noting that the bottom side 210 can define a footprint.

As an example, the device 200 may include one or more processors 212, memory 214 (e.g., one or more memory devices), one or more network interfaces 216, and one or more power cells 218. Such components may be, for example, housed with the keyboard housing 220, the display housing 240, and/or the keyboard housing 220 and the display housing 240.

In the example of FIG. 2, the one or more recesses 301, 302, 303 and 304 may be utilized to removably store one or more components. For example, consider removable storage of one or more ear buds (e.g., wireless earphones), a camera (e.g., a still camera, a video camera, etc.), a memory device, a biometric device, a security device (e.g., a trusted platform module (TPM)), etc. In such examples, the device 200 can include circuitry that can be operatively coupled to one or more removably storable components in one or more of the recesses 301, 302, 303 and 304 (e.g., via wire, wirelessly, etc.).

Figure 3:
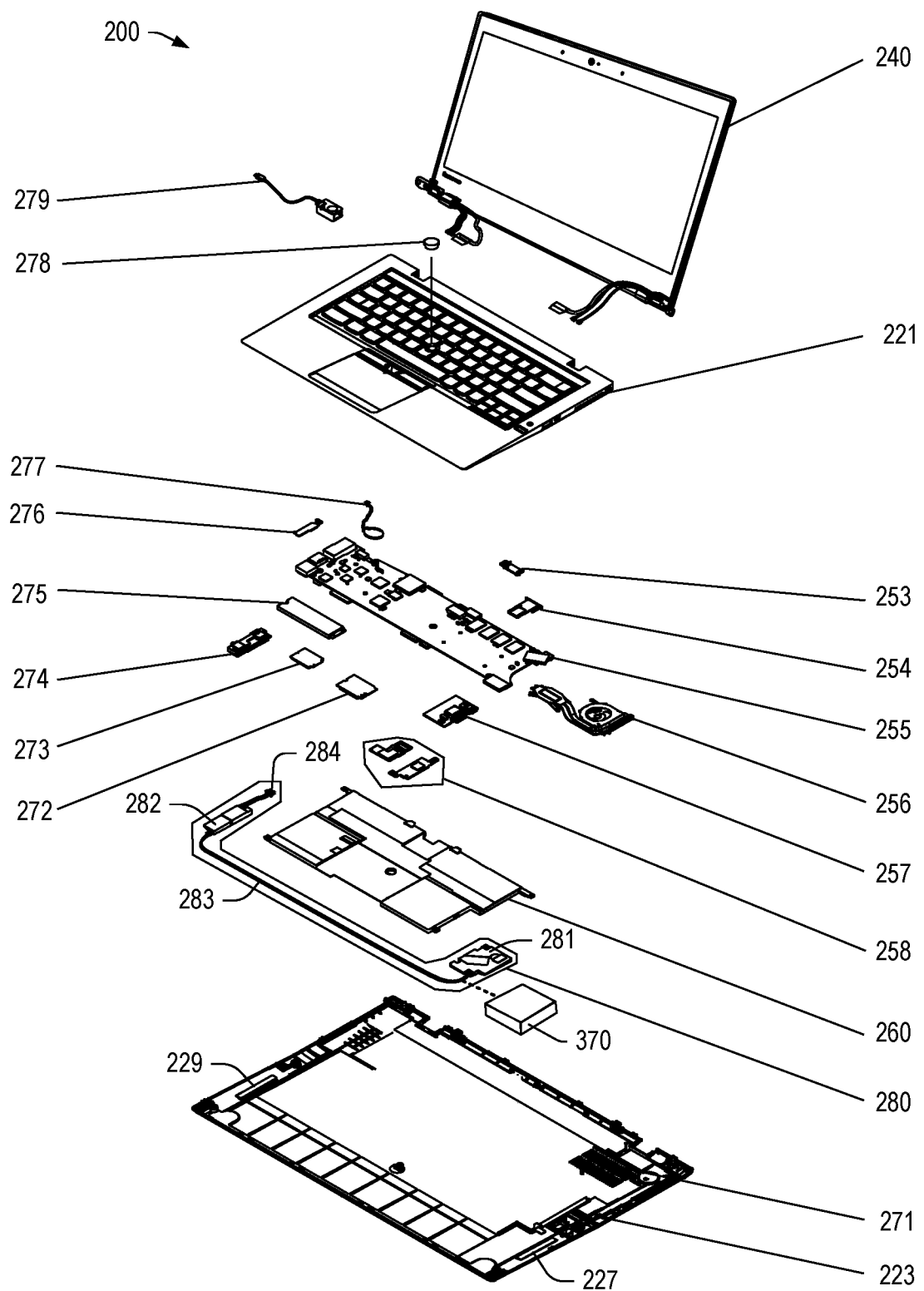
FIG. 3 is a diagram of an example of the device of FIG. 2.

FIG. 3 shows an exploded view of the device 200 of FIG. 2, which shows the display housing 240, an upper assembly of the keyboard housing 221 and a lower assembly of the keyboard housing 223 where the upper assembly of the keyboard housing 221 and the lower assembly of the keyboard housing 223 can be joined to form the keyboard housing 220. As shown, the lower assembly of the keyboard housing 223 can include one or more vents 271, which can provide for cooling, etc. As shown, the upper assembly of the keyboard housing 221 includes a keyboard as a human input device (HID). As an example, the lower assembly of the keyboard housing 223 can be a base cover assembly that covers the upper assembly of the keyboard housing 221; noting that various components may be mechanically coupled to the upper assembly of the keyboard housing 221 where, for example, screws, bolts, etc., may be positioned in through bores and/or bosses of the lower assembly of the keyboard housing 223 to thread into bores and/or bosses of the upper assembly of the keyboard housing 221. As an example, during servicing, the lower assembly of the keyboard housing 221 may be removed via unscrewing of screws, bolts, etc., to access various components of the keyboard housing 220.

As an example, a laptop computer (e.g., notebook computer) can include a display housing that is an assembly that includes one or more covers or shells and can include a keyboard housing that is an assembly that includes one or more covers or shells. For example, a display housing can include an A-cover and a B-cover that mate where the A-cover forms a back side of the display housing and where the B-cover forms a bezel on a front side or display side of the display housing about a display (e.g., a display surface) and, for example, a keyboard housing can include a C-cover and a D-cover that mate where the C-cover forms a front side or a keyboard side of the keyboard housing and where the D-cover forms a back side, bottom side or base side of the keyboard housing. In the example of FIG. 3, the lower assembly of the keyboard housing 223 can be a D-cover assembly that covers the upper assembly of the keyboard housing 221, which can be a C-cover assembly. In such an example, the D-cover assembly and the C-cover assembly can each include a shell such as, for example, a D-cover shell and a C-cover shell. As an example, a tablet can include a top shell that may be or include a bezel (e.g., a display bezel) and a bottom shell. As an example, a display may be a top shell, for example, consider a display that can be attached to a bottom shell to form a housing of a device (e.g., consider a tablet device, a smart phone device, etc.).

As an example, a shell can be a part that is formed by one or more processes such as, for example, molding (e.g., injection molding), 3D printing (e.g., additive manufacturing, etc.), stamping (e.g., metallic sheet stamping), etc. As an example, a shell can include an injection molded part and a stamped part where, for example, the injection molded part is an insert for the stamped part or vice versa.

In the example of FIG. 3, one or more recesses can be defined by at least a portion of the lower assembly of the keyboard housing 223 (e.g., D-cover assembly) and/or at least a portion of the upper assembly of the keyboard housing 221 (e.g., a C-cover assembly). For example, a recess may be a tray recess that is in a space that can be between an upper surface of the upper assembly of the keyboard housing 221 and a lower surface of the lower assembly of the keyboard housing 223. As an example, a tray may be formed as part of a keyboard housing (e.g., a D-cover, a C-cover, etc.) and/or may be disposed at least in part in or via an opening of a keyboard housing (e.g., a D-cover, a C-cover, etc.). As an example, where a display housing includes a tray recess, it may be similarly be formed as part of an A-cover and/or a B-cover and/or disposed at least in part in or via an opening of an A-cover and/or a B-cover. As mentioned, a tablet device can include opposing covers or a cover and a display where, for example, a recess can be between covers or a cover and a display.

Various examples of components are shown in FIG. 3, including a SIM card tray bracket 253, a SIM card tray 254, a system board assembly 255 (e.g., a motherboard), a fan 256, an RJ45 card with a USB connector 257, a fingerprint reader assembly 258, a lithium ion battery 260, a speaker assembly 280, a wireless WAN card 272, a wireless LAN card 273, an audio card with a USB connector 274 (e.g., audio circuitry), a M.2 solid-state drive 275 (SSD), a DC-in bracket 276 (e.g., for DC power), a coin-cell battery (e.g., for back-up power) 277, a trackpoint cap 278 for a trackpoint human input device (HID), and an Ethernet extension adapter 279. In the example of FIG. 3, the fan 256 can be positioned adjacent to the one or more vents 271 of the lower assembly of the keyboard housing 223 such that air may be drawn in and/or exhausted from a space defined by and between the upper assembly of the keyboard housing 221 and the lower assembly of the keyboard housing 223.

In the example of FIG. 3, the SIM card tray 254 can be opened with a straightened paper clip where the paper clip is inserted into the hole and pushed inwardly until the tray is released. As an example, a device can include a cover that covers a SIM card slot where the cover has to be removed before accessing the SIM card slot. A SIM card may be a mini-SIM card, a microSIM card, or a nano SIM card. A SIM card includes cellular circuitry.

In the example of FIG. 3, the speaker assembly 280 includes a first sub-enclosure 281 for a first speaker driver, a second sub-enclosure 282 for a second speaker driver, a cable 283 and a connector 284. In the example of FIG. 3, the lower assembly of the keyboard housing 223 includes a first speaker opening 227 (e.g., a first speaker vent) and a second speaker opening 229 (e.g., a second speaker vent). In the example of FIG. 3, the first and second speaker drivers of the first and second sub-enclosures 281 and 282 are directed in a direction toward the first and second speaker openings 227 and 229, respectively. In such an arrangement, sound produced emanates from the first and second speaker openings 227 and 229 toward a support surface such as a desktop, a tabletop, a countertop, etc., when the device 200 is supported on such a support surface. Such on-board speakers do not face a user; rather, they may be characterized as facing away from a user (e.g., where the user's hands are positioned with respect to the keyboard 224 of the keyboard housing 220). As an example, a device can include one or more speakers that face toward a user, which may include one or more vents of a surface that faces upwardly.

FIG. 3 also shows an example of a component 370, which may be an active component that can be electronically coupled to circuitry of the device 200 using wired and/or wireless circuitry. For example, the component 370 can include one or more speakers such that it may be part of the speaker assembly 280 where the component 370 may be removable from the device 200. For example, a device can include a processor; memory accessible to the processor; a housing assembly that includes a display and a tray recess; and a speaker tray disposed in the tray recess. Such a speaker tray can include one or more speakers and/or may receive one or more speakers. For example, the speaker tray can be an ear bud tray that receives one or more ear buds where an ear bud includes one or more speakers. As an example, the cable 283 may provide for transmission of power and/or data. For example, consider the cable 283 as being a serial bus cable (e.g., universal serial bus, etc.) that can be utilized to charge one or more rechargeable batteries of a component and/or provide data to a component using a wired and/or a wireless connection.

In the example of FIG. 3, the component 370 may be a removable speaker enclosure that can be removed from a recess of the device 200. In such an example, when received by the recess of the device 200, the speaker enclosure may function akin to a fixed speaker enclosure such as the speaker enclosures 281, which can align with an opening such as the opening 227. As an example, the component 370 can be or can include a removable wireless speaker that is operable using wireless technology (e.g., a BLUETOOTH communication protocol, etc.). As an example, the component 370 can be a removable ear bud case that can receive one or more ear buds. Such a case can include circuitry, which may provide for wired and/or wireless transmission and/or receipt of power and/or data (e.g., audio data, other date, etc.).

In the example of FIG. 3, the component 370 can be removable or include a removable part or parts where space occupied by the component 370 may be space that would otherwise be substantially occupied by a non-removable component (e.g., a component that is fixed within the device 200 between the upper and lower assemblies 221 and 223 of the keyboard housing 220 such that removable requires separation of those assemblies 221 and 223).

Figure 4:
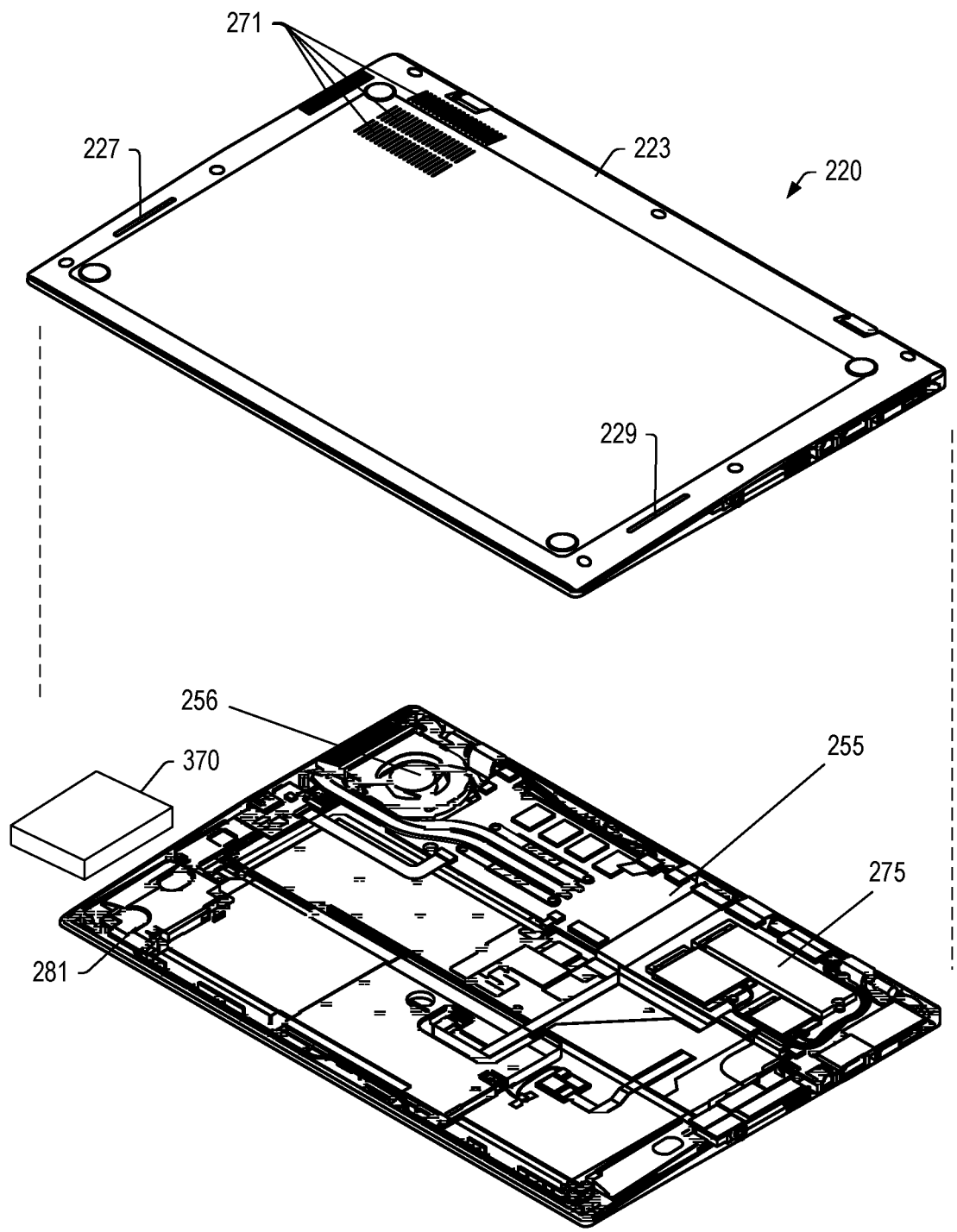
FIG. 4 is a diagram of the example of the device of FIG. 2.

FIG. 4 shows an exploded view of the keyboard housing 220 where the component 370 may be included, for example, as a substitute for the speaker enclosure 281. FIG. 4 shows the system board 255, the SSD card 275 and the speaker enclosure 281, where the component 370 may be included, optionally as a speaker enclosure substitute. FIG. 3 and FIG. 4 show how various parts can be arranged in a housing; noting that one or more recesses may be created, enlarged, etc., for receipt of a component such as the component 370, etc.

Figure 5:
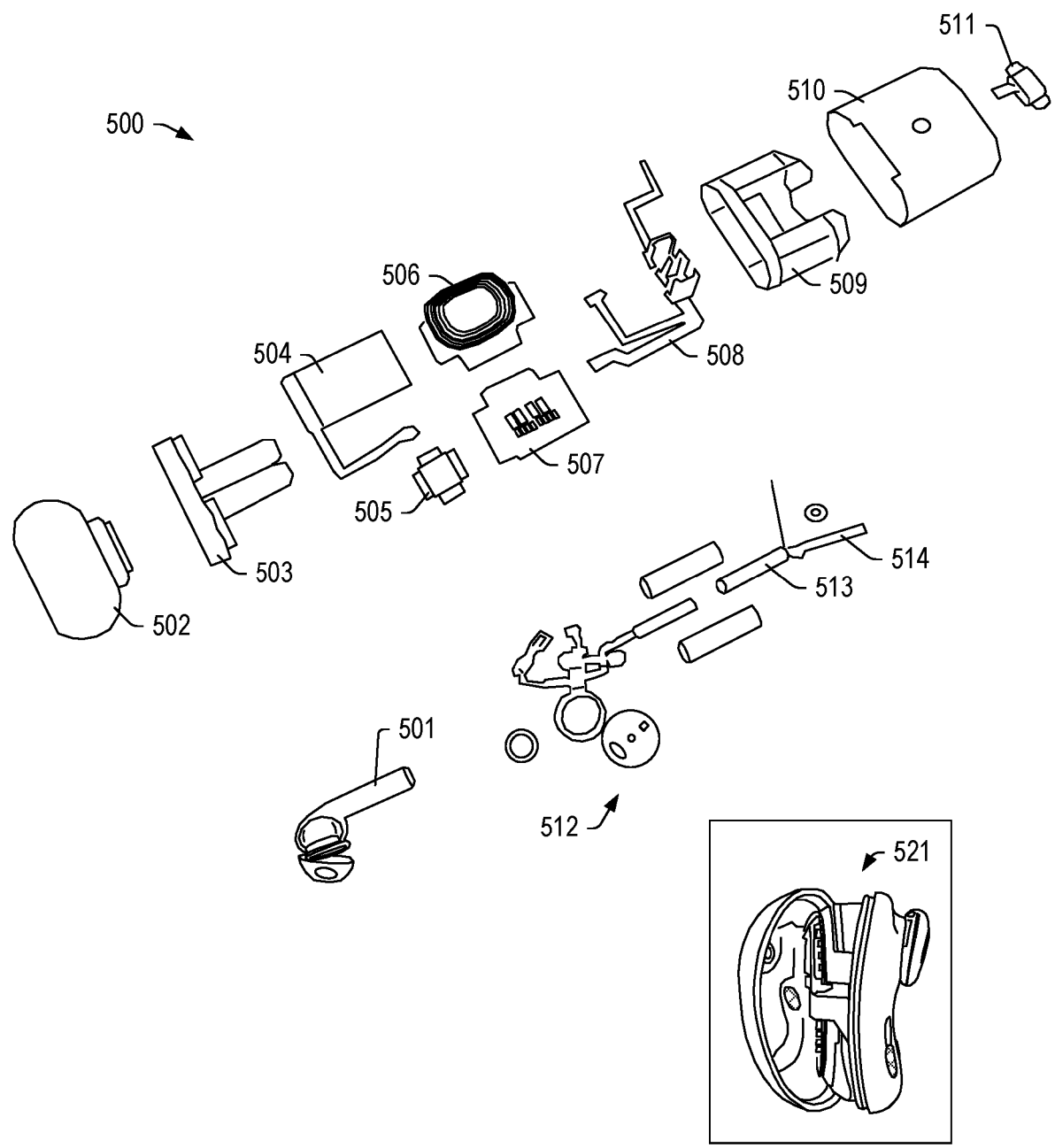
FIG. 5 is a diagram of an example of an assembly.

FIG. 5 shows an exploded view of an example of an ear buds assembly 500, which may be a portable assembly such that a user can transport ear buds and charge the ear buds. Specifically, FIG. 5 shows the ear buds assembly 500 as including an ear bud 501 (partially opened), a case flip top 502, a case ear bud dock 503, a case battery 504, a synchronization button 505, a case wireless charging coil 506 (e.g., an antenna), a case circuitry board 507, a case cable 508, a case inner assembly 509, a case housing 510, a case charging port 511, an ear bud sub-assembly 512 including a speaker driver (e.g., a speaker), sensors, and circuitry board, an ear bud rechargeable battery 513, and an ear bud antenna 514. The ear buds assembly 500 can include two ear buds that can be received by a case. FIG. 5 also shows another example of an ear bud 521, which includes a speaker driver and various circuitry. As shown, an ear bud can have a shape where a portion of the ear bud can be disposed in an ear of a user.

An ear bud may sit in the outer ear and create a loose seal or a tight seal with the ear. A loose seal may provide a relatively low isolation from outside noise while a tight seal may exclude more outside noise. As an example, an ear bud may be an in-ear monitor (IEM), which can have an ear tip that forms a seal with the ear canal. An ear tip may be referred to as an ear nub, an ear bit, an insert, a fitting, etc., which can determine sound quality, comfort, isolation, and fit security. An ear bud driver (e.g., speaker driver) can be, for example, a dynamic driver or a balanced armature driver.

An ear tip can be a shaped interface part that contacts an ear, for example, that contacts a wall of an ear canal. An ear tip may be made of a resilient material or a rigid material. A resilient material can aim to form to a user's ear canal at least in part through deformation of the resilient material; whereas, a rigid material may be angle, depth controlled, etc., to achieve a desired fit. As an example, an ear bud may be bendable, foldable, hinged, etc. For example, consider an ear bud that can be in a folded, compact position and transitioned to an unfolded, use position. In such an example, the folded, compact position may result in a smaller size for purposes of storage, which may be storage in a tray (e.g., an ear bud tray, etc.).

As an example, an ear bud may include one or more features of an APPLE AIRPODS ear bud, a SAMSUNG GALAXY BUDS ear buds, a SONY ear bud, an ANKER ear bud, a JABRA ear bud, a BOSE ear bud, a SKULLCANDY ear bud, a B&O ear bud, etc. As an example, features of an assembly can include BLUETOOTH circuitry, personal assistant circuitry, one or more microphones, etc.

As an example, the first generation AIRPODS ear buds are approximately 4 g each, where a charging case for the ear buds is approximately 38 g. As to dimensions, each ear bud is approximately 16.5 mm by 18.0 mm by 40.5 mm and the charging case is approximately 44.3 mm by 21.3 mm by 53.5 mm. The ear buds include BLUETOOTH circuitry and the charging case includes a LIGHTENING connector. As to sensors, each of the ear buds includes dual beamforming microphones, dual optical sensors, a motion-detecting accelerometer, and a speech-detecting accelerometer.

As an example, the component 370 of FIG. 3 may include various features of an ear bud case where, for example, the component 370 may be fixed, moveable, removable or movable and removable. As an example, an "internal case" for an ear bud or ear buds in a recess of a housing may be formed via one or more housing parts such that a mass is less than an external case such as the case of the ear buds assembly 500 of FIG. 5. Where a user utilizes one or more ear buds with a computing device, storing the one or more ear buds in a recess of a housing of the computing device can be more convenient as the user does not need to keep track of a separate case that is not receivable by a recess of the computing device. As mentioned, where a component such as the component 370 is removable, it may be utilized to transport one or more electronic components, which may be or include one or more ear buds. As explained, the component 370 can include circuitry, one or more interfaces (e.g., wired, wireless, etc.) that can provide for power and/or data (e.g., for wired and/or wireless charging, instructions, audio signals, etc.).

Figure 6:
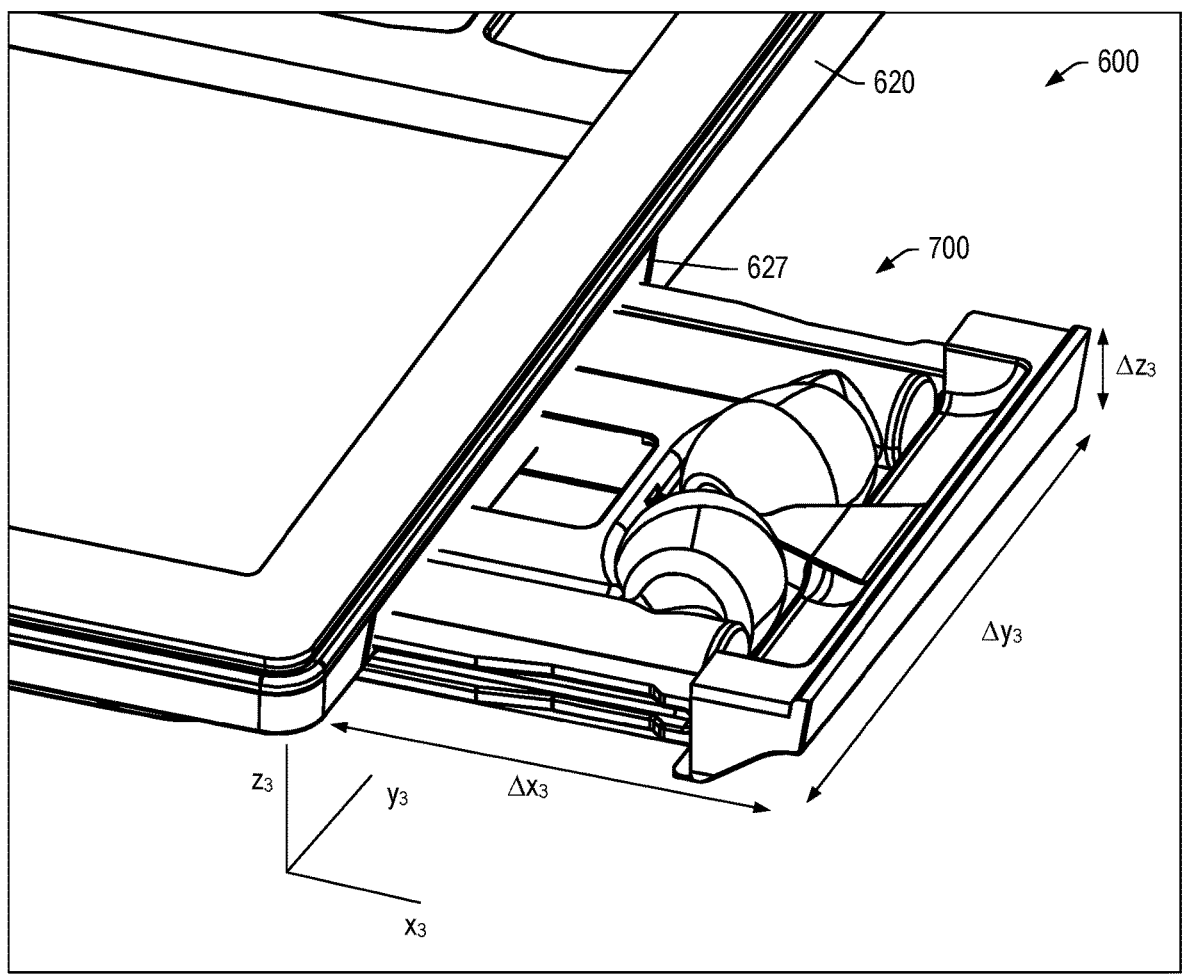
FIG. 6 is a diagram of an example of a device.

FIG. 6 shows an example of a device 600 that includes a housing 620 as part of a housing assembly where the housing 620 includes an opening 627 that can be utilized by a component 700, which can be an assembly. The component 700 can be defined at least in part using a Cartesian coordinate system such as the Cartesian coordinate system shown in FIG. 6, which includes $x_3$, $y_3$ and $z_3$ axes. As shown, the component 700 can be defined using a thickness $\Delta z_3$, a width $\Delta x_3$ and a depth $\Delta y_3$. As shown, the thickness $\Delta z_3$ may be less than a thickness of the housing 620 at the opening 627.

In the example of FIG. 6, the device 600 can include a recess with dimensions sufficient to accommodate at least a portion of the component 700. For example, consider a recess that can receive the component 700 such that an edge of the component 700 aligns with an edge of the housing 620 where the component 700 is in a fully recessed or stored position (e.g., consider a flush alignment, etc.).

Figure 7A:
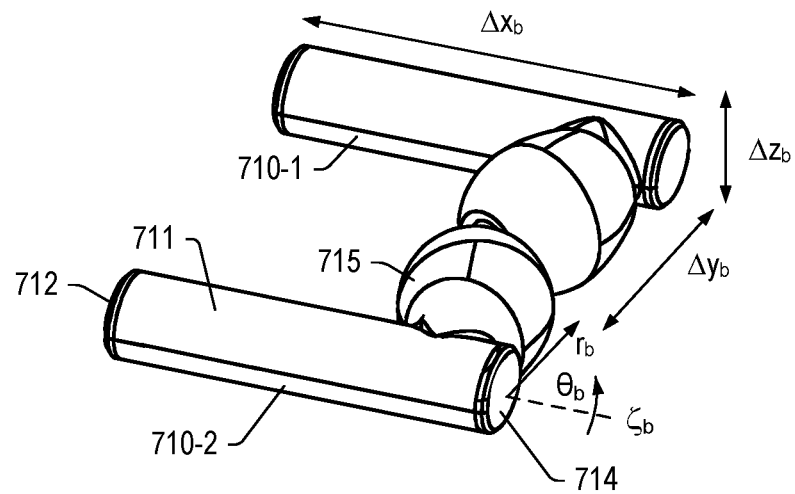
FIG. 7A and FIG. 7B are diagrams of an example of wireless earphones and an example of a tray of a device, respectively.
Figure 7B:
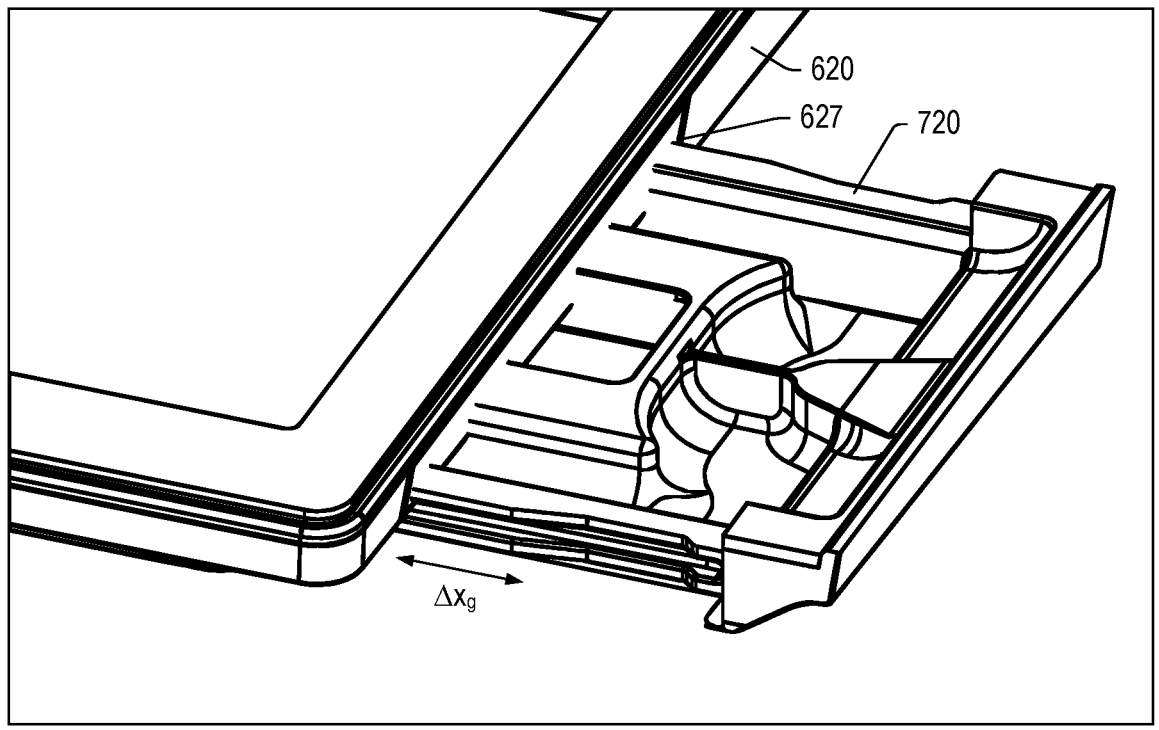

FIG. 7A shows an example of ear buds 710-1 and 710-2 and FIG. 7B shows the component 700 as including a tray 720, which may be referred to as an ear bud tray that can receive one or both of the ear buds 710-1 and 710-2.

As shown in FIG. 7A, each of the ear buds 710-1 and 710-2 may be defined using one or more coordinate systems, which can include Cartesian, cylindrical and/or other. For example, consider an $x_b$, $y_b$ and $z_b$ Cartesian coordinate system that can be used to define dimensions a thickness $\Delta z_b$, a width $\Delta x_b$ and a depth $\Delta y_b$. As an example, a cylindrical coordinate system can include a longitudinal axis $\zeta_b$, a radial coordinate $r_b$ and an azimuthal coordinate $\theta_b$. As shown, an ear bud can include a cylindrical canister portion 711 with opposing ends 712 and 714 and a speaker portion 715, which can be shaped for insertion into an ear. As shown, the speaker portion 715 may be substantially spherical (e.g., oblate spherical, etc.). With respect to the cylindrical canister portion 711, the speaker portion 715 may extend at an angle that can be defined using the azimuthal coordinate $\theta_b$. While the canister is shown as being cylindrical, as an example, another shape may be utilized (see, e.g., the ear bud 521 of FIG. 5). In the example of FIG. 7A, the two ear buds 710-1 and 710-2 are shown as being oriented with speaker portions 715 adjacent to each other where the longitudinal axes of the cylindrical canister portions 711 are substantially parallel; noting that other orientations may be utilized, which may consider volume occupied, ergonomics, etc. As to ergonomics, an ability of a user to insert and remove ear buds may be considered. For example, as shown in FIG. 6, the speaker portions 715 are closer to the edge of the housing 620 such that upon outward translation of the tray 720 the speaker portions 715 are furthest from the edge of the housing 620, which may provide an amount of space (e.g., a gap) between the speaker portion 715 and the edge of the housing 620 for a user to insert a fingertip to grab one or both of the ear buds 710-1 and 710-2. FIG. 7B shows a dimension $\Delta x_g$, which can be a gap dimension that is sufficient for a user to insert a fingertip for at least removable of one or two ear buds. As an example, the dimension $\Delta x_g$ may be in a range from approximately 5 mm to approximately 40 mm. As explained above, the first generation AIRPODS ear buds are each approximately 40.5 mm in length (e.g., longitudinal axis of cylindrical canister portion). As an example, the tray 720 may translate a distance that is approximately the same (e.g., +/−20 percent) of a length of an ear bud where a gap is created that is sufficient for a fingertip to remove the ear bud from the tray 720.

As an example, a tray can include one or more removal assistance mechanisms. For example, consider a spring-loaded member that can apply a biasing force that causes movement of an ear bud or ear buds. In such an example, a trigger may be utilized such that movement of the tray 720 causes triggering of the spring-loaded member. As another example, consider a rotational mechanism that can rotate an ear bud or ear buds from the flat planar orientation as shown in FIG. 6 and FIG. 7A to a more upright or tilted orientation that provides space sufficient to allow a user to contact and remove one or two ear buds. As an example, consider a socket or sockets that are rotatably coupled to a cam or gear rack such that translation of the tray 720 causes rotation of the socket or sockets where upon outward translation of the tray 720, the socket or sockets rotate to tilt an ear bud or ear buds, and where upon inward translation of the tray 720, the socket or sockets rotate to positon the ear buds in a more planar orientation, which can be for storage.

Figure 8:
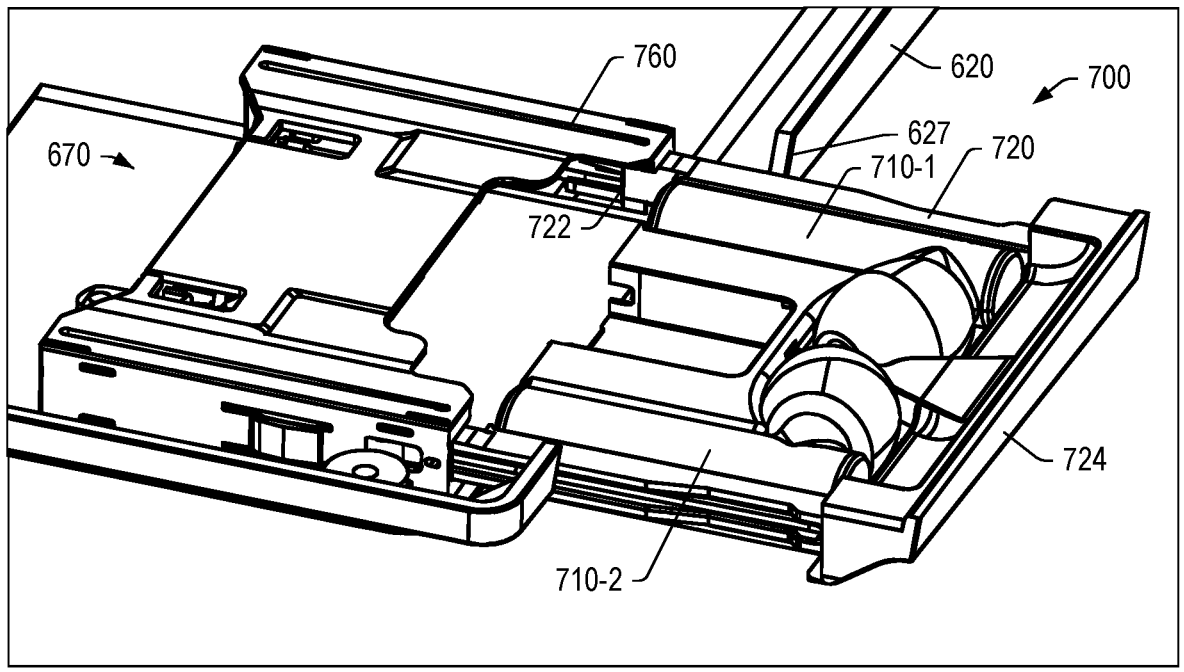
FIG. 8 is a diagram of an example of a portion of a device.

FIG. 8 shows an example of the component 700 with the upper portion of the housing 620 removed. As shown, the housing 620 includes a recess 670, which may be a tray recess. The component 700 is shown as including a chassis 760 that can be operably coupled to the tray 720, for example, for translation of the tray 720 into and out of the recess 670. As shown, the chassis 760 may remain stationary in the recess 670, noting that the chassis 760 can be an assembly with one or more moving parts. In the example of FIG. 8, the tray 720 is shown as including an aft end 722 and a fore end 724 where, in a closed position, the fore end 724 can be substantially aligned with an edge (e.g., a side) of the housing 620.

Figure 9A:
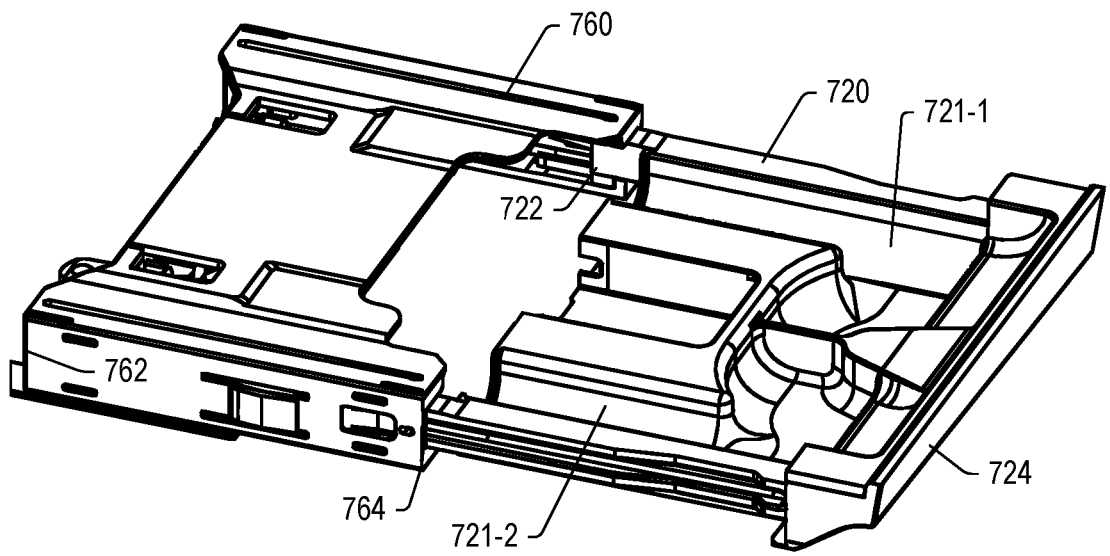
FIG. 9A and FIG. 9B are diagrams of an example of a component in an open state and in a closed state, respectively.
Figure 9B:
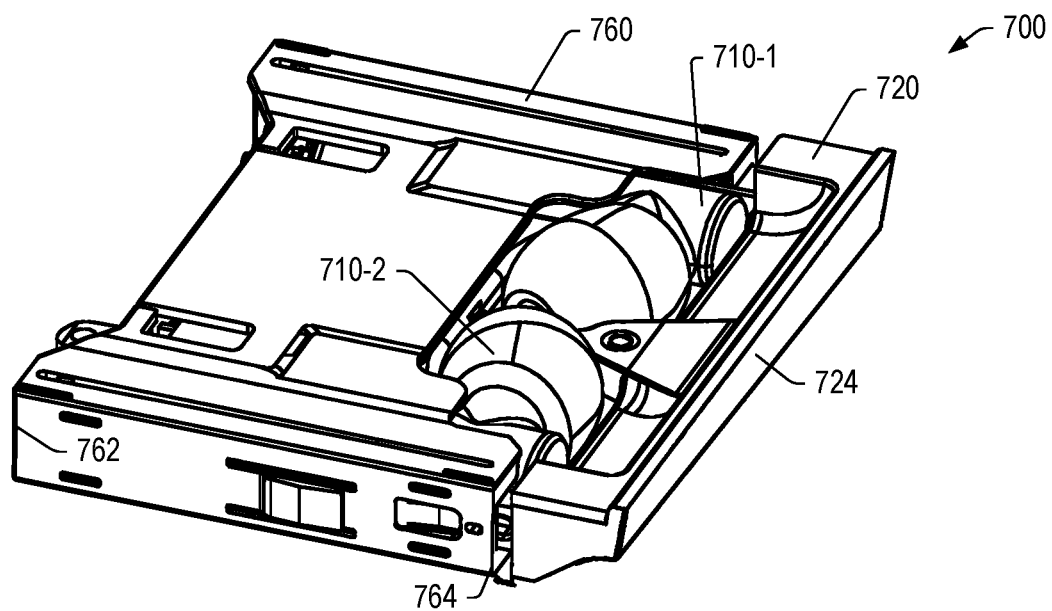

FIG. 9A shows an example of the component 700 without the ear buds 710-1 and 710-2 and with the tray 720 extended outwardly and FIG. 9B shows an example of the component 700 with the ear buds 710-1 and 710-2 with the tray 720 in a closed position, where an Cartesian coordinate system such as the $x_3$, $y_3$ and $z_3$ coordinate system may be utilized to define or describe one or more features (e.g., size, volume, etc.). As shown, the chassis 760 can include an aft end 762 and a fore end 764 where the tray 720 is received via the fore end 764 of the chassis 760. As shown in FIG. 7A, the tray 720 includes a first ear bud cavity 721-1 and a second ear bud cavity 721-2. The cavities 721-1 and 721-2 are shown as being symmetric about a central symmetry plane (e.g., an x,z-plane). As shown in FIG. 9B, the ear buds 710-1 and 710-2, which are a first ear bud 710-1 and a second ear bud 710-2, can be symmetric about the same central symmetry plane.

FIG. 10A shows an example of a portion of the component 700 without the chassis 760 to provide a better view of an example of circuitry 800, FIG. 10B shows an example of at least some of the circuitry 800 and FIG. 10C shows an example ear bud 710. As shown, the circuitry 800 can include electrical contacts 810-1 and 810-2, a brace 830, a serial bus port 835 and a circuitry board 850 and the ear bud 710 can include electrical contacts 713 on the end 712, which may be an end of the cylindrical canister portion 711. As shown, the electrical contacts 810-1 and 810-2 can include pogo pins, which can be spring-loaded electrical contacts. For example, consider a number of electrical contacts of the circuitry 800 that corresponds to a number of electrical contacts of an ear bud or ear buds.

As an example, the serial bus port 835 can be a universal serial bus portion (USB port). As an example, the circuitry board 850 can include circuitry that can manage power and/or data. As an example, the circuitry board 850 can manage charging of rechargeable batteries of the ear buds 710-1 and 710-2 via the electrical contacts 810-1 and 810-2, respectively. As an example, a spring-loaded electrical contact may apply an amount of force that helps to maintain electrical contact and that helps to maintain an ear bud in an ear bud cavity. FIG. 10A shows the tray 720 as including a divider 728 where, for example, spring force may push the speaker portions 715 of the ear buds 710-1 and 710-2 against the divider 728 and/or, for example, may push the cylindrical canister portions 711 against a surface proximate to the fore end 724. In the example of FIGS. 10A, 10B, and 10C, each set of the electrical contacts 810-1 and 810-2 includes three electrical contacts and each of the ear buds 710-1 and 710-2 includes three electrical contacts 713 (e.g., targets, lands, etc.). As shown, the electrical contacts 713 may be aligned (e.g., across a line) or, for example, may be concentric rings such that orientation can differ while electrical contact can still be made.

Figure 11A:
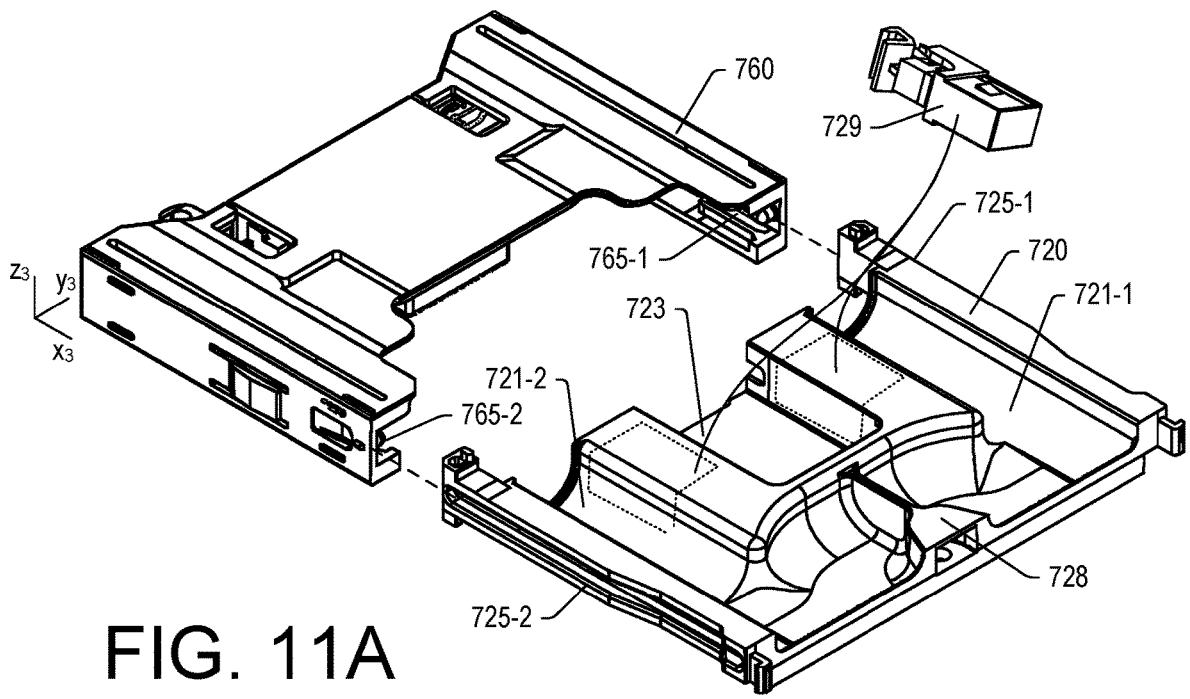
FIG. 11A and FIG. 11B are diagrams of an example of a chassis and an example of a tray.
Figure 11B:
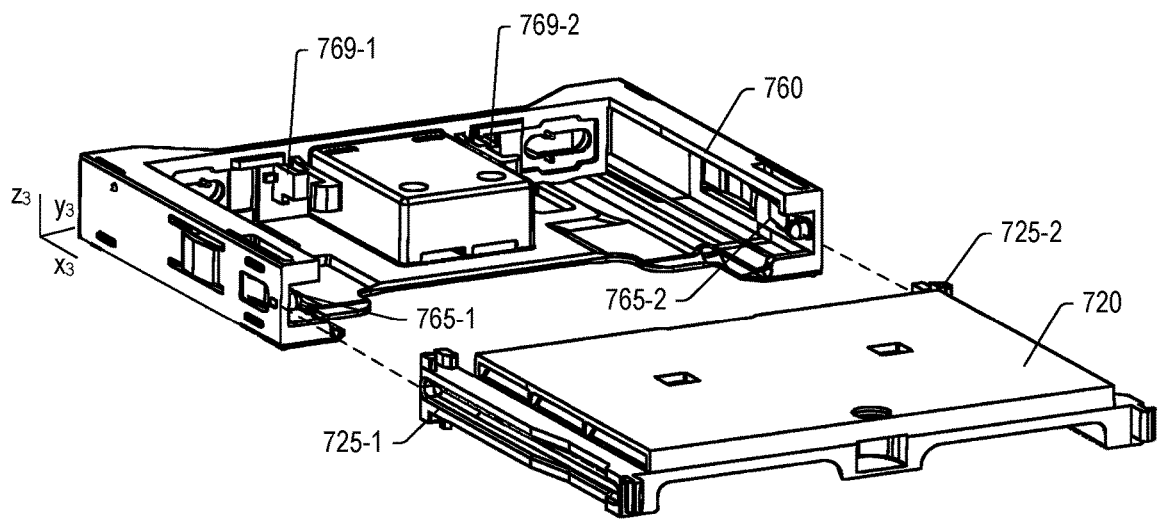

FIG. 11A shows a view of an example of the chassis 760 and the tray 720 and FIG. 11B shows another view of the example of the chassis 760 and the tray 720. As shown, the tray 720 can include a cutout 723 that can accommodate a portion of the circuitry 800, for example, as shown in FIG. 10A. As shown, the tray 720 can include a rail 725-1 and a rail 725-2 and the chassis 760 can include a track 765-1 and a track 765-2 where the rail 725-1 can be translatably received by the track 765-1 and the rail 725-2 can be translatably received by the track 765-2.

FIG. 11B shows portions 769-1 and 769-2 of an example of a push type mechanism that can be coupled with other portions carried by the tray 720. For example, consider another portion 729 of a push-push mechanism that can latch one of the portions 769-1 and 769-2 (e.g., consider two of the portions 729 being carried by the tray 720). In such an example, a user may push the fore end 724 of the tray 720 inwardly where the push-push mechanism responds by unlatching the tray 720 and pushing the tray 720 outwardly. Such a mechanism may provide for latching in a stored position of the tray 720, maintaining the tray 720 in a coupled state with the chassis 760, and for unlatching of the tray 720 for outward translation of the tray 720, for example, to expose ear buds (e.g., for removal) or the ear bud cavities 721-1 and 721-2 (e.g., for insertion of ear buds). As an example, a push-push mechanism can include one or more features of a mechanism marketed by ITW Motion USA, Frankfort, Ill. (see, e.g., mechanism with part number 42-007149, etc.).

As an example, the component 700 may be releasable for removal from a housing. For example, consider removal of the chassis 760 and the tray 720 such that the component 700 is transportable (e.g., separate from the housing 620). In such an example, the component 700 can include a port such as a USB port (e.g., USB-A, USB-B, USB-C, etc.) that can allow for use of the component 700 where the component 700 is not physically attached to the housing 620. In such an example, the housing 620 may include a frame that can removably receive the component 700. For example, consider a first push-push mechanism for the tray 720 and a second push-push mechanism for the component 700. In such an example, the second push-push mechanism may be operable via application of force that is in excess of the force required for the first push-push mechanism. As an example, where desired, a user may remove the component 700 from the housing 620 and charge it (e.g., where the chassis 760 and/or the tray 720 includes a rechargeable battery) and/or ear buds disposed in it using another source of power (e.g., via wire, wirelessly, etc.).

Figure 12A:
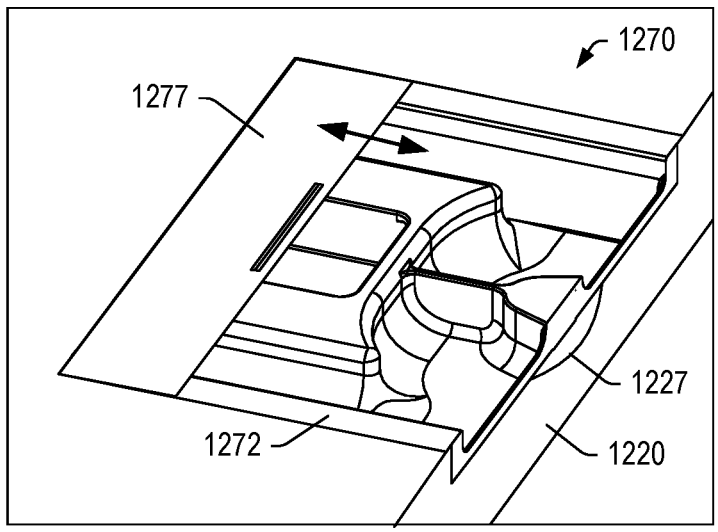
FIG. 12A and FIG. 12B are diagrams of examples of a component received in a recess of a housing of a device.

FIG. 12A shows an example of a housing 1220 and a component 1270 that can include a cover 1277, which may be a sliding cover. As shown, the component 1270 includes a tray 1272 that is disposed in a recess of the housing 1220. In such an example, the housing 1220 can include one or more electrical connectors that can be operatively coupled to circuitry of the component 1270, which can include one or more ear buds. In the example of FIG. 12A, the housing 1220 can include a notch 1227 that may be utilized for removing the component 1270 from the housing 1220. For example, a user may close the cover 1277 and then remove the component 1270 from the housing 1220 by inserting a fingertip, fingernail, etc., in the notch 1227 where the component 1270 may include a connector that allows for electrical connection separate from the housing 1220 (e.g., a USB connector, etc.). As an example, the tray 1272 may be made at least in part from a resilient material that can deform such that an interference fit can be made between the tray 1272 and the housing 1220. For example, consider a rubber (e.g., natural and/or synthetic) or other polymeric material that can be squeezed into a recess of the housing 1220. As an example, the cover 1277 may be coupled to the component 1270 such that it is removable. As an example, the component 1270 may include grooves (e.g., slots, etc.) where the cover 1277 is a planar cover that can slide in the grooves to cover and to open the tray 1272.

In the example of FIG. 12A, the component 1270 may be exposed at one or more sides, ends, etc. As an example, the component 1270 may be substantially flush with a surface or surfaces of the housing 1220. As an example, the component 1270 may be provided without the cover 1277. In the example of FIG. 12A, the component 1270 may be open along an edge (e.g., a side) of the housing 1220, which may facilitate removal and/or insertion of an ear bud or ear buds in the tray 1272. In such an example, a user may use a thumb and finger to grasp an ear bud (e.g., at least in part via a speaker portion, etc.) for removal from the tray 1272 where one of the user's digits approaches from a top surface and another one of the user's digits approaches from a side surface. As an example, the tray 1272 may provide for removable of at least one or more ear buds where the housing 1220 is a housing of a clamshell device where another housing can cover the tray 1272. In such an example, the other housing may be shaped to provide space for removal of an ear bud, removal of the tray with and/or without an ear bud or ear buds, etc. As an example, where a device is a clamshell device, when in a closed orientation (closed clamshell), a tray may be covered such that an electronic component in the tray may be secured such that risk of the electronic component inadvertently falling out of the tray (e.g., during transport of the device, etc.) is reduced or substantially eliminated.

Figure 12B:
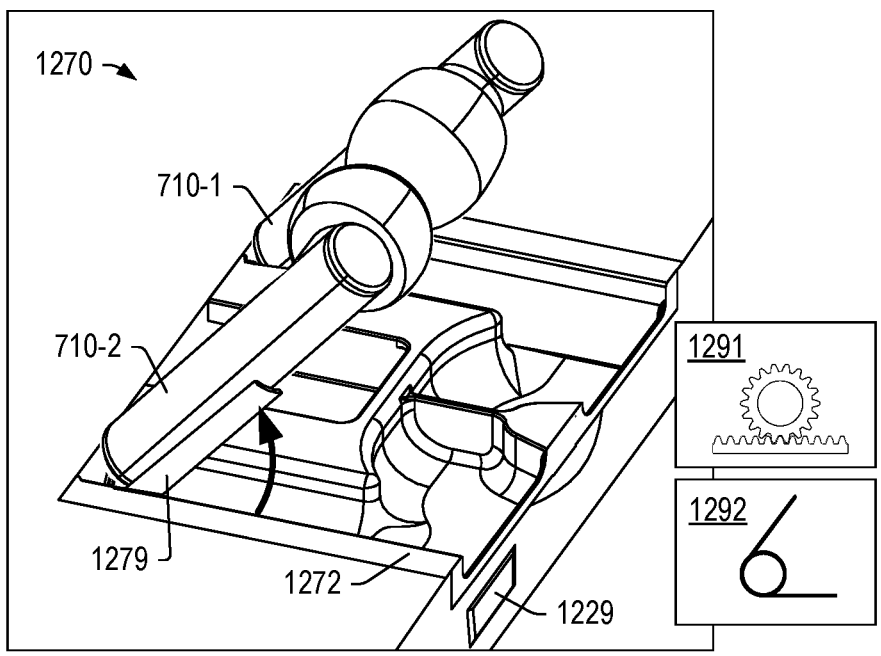

FIG. 12B shows an example of the component 1270 where a member or members 1279 can be actuated to move one or more ear buds 710-1 and 710-2 with respect to the tray 1272. As an example, such a member or members may be actuated using a push-push mechanism or another mechanism. For example, consider a push-push mechanism where a user can push downwardly on an ear bud or ear buds such that the member 1279 unlatches and via a spring bias causes movement of the ear bud or ear buds. As an example, upon removal of an ear bud or ear buds, the member 1279 may automatically retract and reset or, for example, a user may apply force to retract and reset the member 1279. As mentioned, where a tray is translatable, a rack and gear type of mechanism (e.g., rack and pinion) may rotate the gear upon translation of the rack. In such an example, a member such as the member 1279 may be operatively coupled to a gear and/or include a gear that meshes with a rack, etc.

In the example of FIG. 12B, an actuator 1229 is shown, which may be a button, a lever, a slider, etc., that can actuate a mechanism that can cause an ear bud or ear buds to move at least partially out of the tray 1272. As an example, a mechanism can include one or more gears 1291, one or more springs 1292, one or more magnets, etc. For example, consider a button that moves a rack gear that causes rotation of a pinion gear that is operatively coupled to a member such as the member 1279 and/or to a gear feature of a portion of an ear bud. As an example, friction may be utilized additionally or alternatively to one or more gears. For example, consider a translating component with a rubberized surface that can be in contact with another rubberized surface. In such an example, components may be akin to a rack and pinion where the rack has a rubber surface that contacts a rubber wheel, a rubber coated wheel, a rubber coated surface of a member, a rubber coated surface of a portion of an ear bud, etc. While rubber is mentioned, which may be natural and/or synthetic, one or more other materials may be utilized where frictional force can be generated such that movement of one component moves another component (e.g., translation to rotation, rotation to translation, etc.). As shown in the example of FIG. 12B, a spring may be a torsion spring, which may be set about a peg or axle. For example, the member 1279 may include a peg or axle about which a coil of a torsion spring is set. In such an example, the torsion spring may be latched in a stored position of the ear buds and release via a part of a push-push mechanism and/or the actuator 1229. For example, consider the member 1279 being biased by a torsion spring such that the member rotates to move the ear bud 710-2 and/or the ear bud 710-1 to a suitable tilt angle. As an example, the component 1270 can include two of the members 1279 where they may be operatively coupled (e.g., via being integrally formed as a single piece with a cross member, via coupling by one or more intermediate parts, etc.). As an example, a cover such as the cover 1277 of FIG. 12A may be operatively coupled to one or more mechanisms for movement of one or more ear buds.

As an example, the actuator 1229 may be operatively coupled to a magnet where the actuator 1229 can cause movement of the magnet. For example, consider a magnet that can be positioned in a manner to apply a magnetic attraction and/or a magnetic repulsion force with respect to one or more magnets of an ear bud. For example, an ear bud can include a driver (e.g., speaker driver) with a magnet where another magnet can be positioned (e.g., oriented per poles) to attract and/or repel the magnet of the driver. In such an example, an amount of attraction force may be sufficient to help retain an ear bud in a tray and/or an amount of repulsion force may be sufficient to help move an ear bud out of a tray. As an example, an ear bud that includes a permanent magnet may include a permanent magnet with a magnetic field strength that is, for example, greater than 0.1 gauss and that may be, for example, greater than 200 gauss. As an example, a mechanism may include a magnet that can be a permanent magnet that may be of a magnetic field strength that is equal to or greater than that of an ear bud that includes a permanent magnet.

Figure 13A:
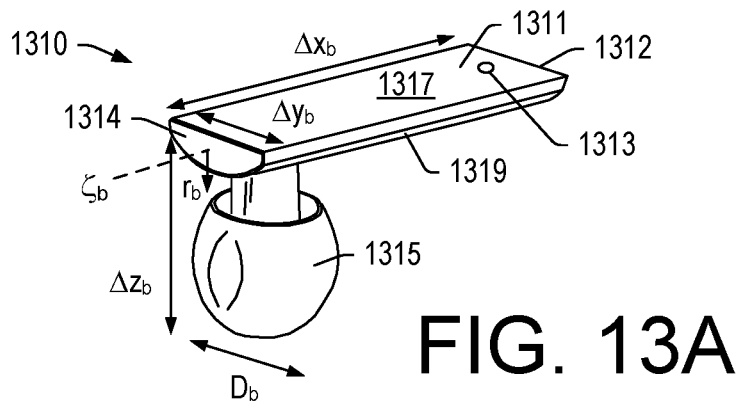
FIG. 13A, FIG. 13B and FIG. 13C are diagrams of an example of a component receivable in a recess of a housing of a device.
Figure 13B:
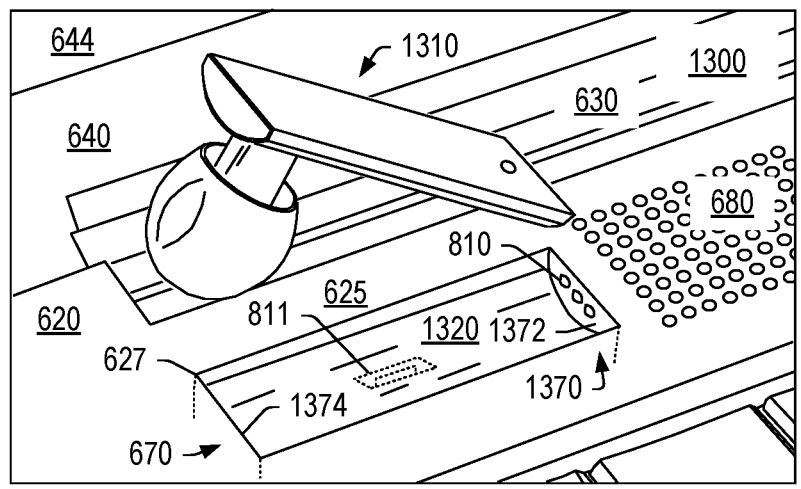
Figure 13C:
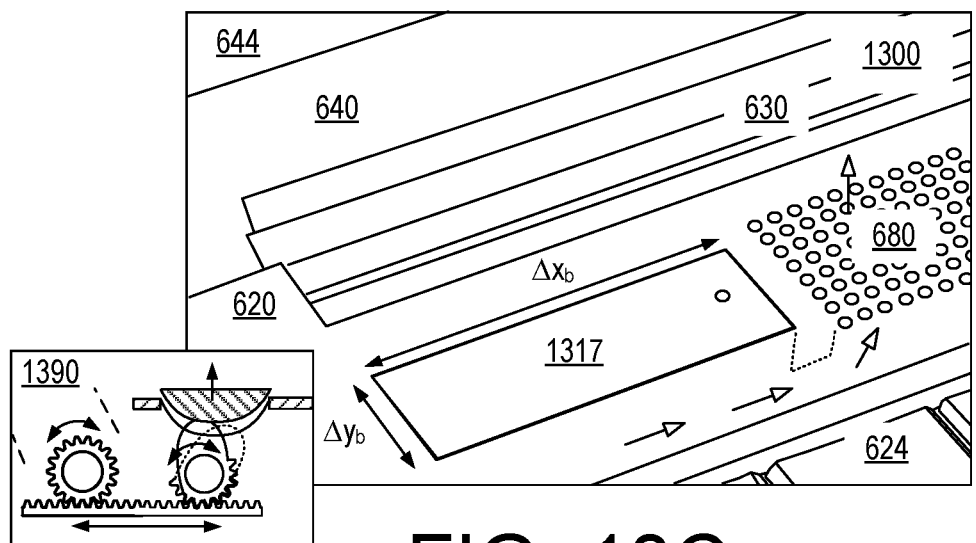

FIG. 13A, FIG. 13B and FIG. 13C show an example of a component 1310 received in a recess 670 of a housing 620 of a device. As shown in FIG. 13B and FIG. 13C, a housing assembly 1300 can include a display 644 carried by a housing 640 of the housing assembly 1300 and a tray recess 670 of another housing 620 of the housing assembly; and an ear bud tray 1320 disposed in the tray recess 670. As shown in FIG. 13B and FIG. 13C, the housing assembly 1300 can include a hinge assembly 630 that couples the housing 620 and the housing 640 where the housing 620 can include a keyboard 624 and may include an audio grille 680 (e.g., one or more openings that are in fluid communication with speaker (e.g., a driver or audio driver).

As shown in FIG. 13A, an ear bud 1310 can include a canister portion 1311 and a speaker portion 1315 where the canister portion 1311 includes opposing ends 1312 and 1314. As shown, the canister portion 1311 can include a surface 1317, which may be a planar surface or a surface of one or more other shapes. As shown in FIG. 13C, when the ear bud 1310 is received in the tray 1320, the surface 1317 can be substantially flush with a surface 625 of the housing 620. As shown, the surface 625 can include an opening 627 that serves as an opening to the tray 1320. The ear bud 1310 may include one or more lights (e.g., one or more LEDs, etc.) that can be illuminated with one or more colors, one or more intensities, etc., to indicate a status of the ear bud 1310 and/or other circuitry.

In the example of FIGS. 13B and 13C, the tray 1320 is shown as being disposed between the keyboard 624 and the hinge assembly 630 and proximate to the speaker grille 680. As an example, the recess 670 can be in fluid communication with openings of the speaker grill 680 such that audio waves emitted by a speaker of the speaker portion 1315 of the ear bud 1310 may travel to and through the speaker grille 680 (see, e.g., open headed arrows in FIG. 13C). In such an example, the ear bud 1310 may provide in-ear functionality and in-housing functionality for the transduction of electronic audio signals. As mentioned, a tray may be positioned proximate to one or more openings (e.g., speaker grille, vent, etc.) such that a speaker of a component can be utilized for generation of sound while the component is received at least in part by the tray.

As shown in FIG. 13A, the ear bud 1310 can be defined using one or more coordinate systems. For example, the canister portion 1311 can be defined using a cylindrical coordinate system and/or a Cartesian coordinate system. In the example of FIG. 13A, the canister portion 1311 can be a shaped as a portion of a cylinder. For example, consider a cutting plane that cuts a cylinder such that a resulting shape has a substantially planar surface and a surface that is rounded, as may be defined by a radius of the cylinder. As shown in FIG. 13A, the surface 1317 can be a planar surface while a surface 1319 can be rounded (e.g., an outer surface of a portion of a cylinder, etc.).

As shown in FIG. 13A, the canister portion 1311 can have a length $\Delta x_b$, a width $\Delta y_b$ and a thickness where a total thickness including the speaker portion 1315 can be $\Delta z_b$ where the speaker portion 1315 may be defined using a diameter $D_b$.

As an example, the speaker portion 1315 can include a polymeric cover or cap. For example, consider a silicone or polysiloxane polymeric cover or cap made at least in part of siloxane. As an example, a cover or cap may be resilient such that the diameter $D_b$ may be slightly greater than a dimension of the opening 627 where the dimension may be approximately equal to the dimension $\Delta y_b$ of the canister portion 1311. In such an example, upon insertion of the ear bud 1310 into the tray 1320, the cover or cap may compress such that its diameter is reduced to fit through the opening 627. In such an example, the cover or cap may help to retain the ear bud 1310 in the tray 1320.

As shown in FIG. 13B, the tray 1320 can be in a chassis 1370 of the housing 620 can include features for circuitry. For example, consider circuitry that includes one or more electrical contacts 810 that may be utilized to provide power and/or data to the ear bud 1310. For example, the ear bud 1310 can include one or more electrical contacts that, when the ear bud 1310 is received by the tray 1320, the one or more electrical contacts can contact the one or more electrical contacts 810 of the housing 620 (e.g., as supported by the chassis 1370 and/or the tray 1320). As shown in FIG. 13B, the tray 1320 and/or the chassis 1370 can include opposing ends 1372 and 1374 where one or more of the ends 1372 and 1374 may include one or more contacts (e.g., electrical contacts such as biased ball contacts, pogo pins, etc.).

As an example, a sub-assembly can include the tray 1320, the chassis 1370 and circuitry where the circuitry may include serial bus and/or other circuitry (see, e.g., various features of the circuitry 800 of FIG. 10A and FIG. 10B).

As shown in FIG. 13B, the housing 620 can include circuitry that is operatively coupled to a connector 811, which may be a surface contact connector, a pogo pin connector, a USB connector, etc. For example, consider the connector 811 as being a male or a female USB-C connector. In such an example, when the ear bud 1310 is removed from the tray 1320, the USB-C connector can be available for connection to a cable, etc. As an example, where the connector 811 is a male connector, the canister portion 1311 of the ear bud 1310 may include a female connector such that when received by the tray 1320 the connectors mate for transmission of power and/or data.

As an example, one or more connectors, contacts, etc., may provide spring force, friction force, magnetic force or another force for helping to retain the ear bud 1310 in the tray 1320. As an example, the ear bud 1310 can include one or more magnets and/or the housing 620 can include one or more magnets such that a magnetic attraction force can be utilized to help retain the ear bud 1310 in the tray 1320, where a user's finger or fingers may be utilized to overcome the magnetic attraction force to remove the ear bud 1310 from the tray 1320.

As mentioned, a push-push mechanism or other mechanism may be utilized to facilitate removable of a component such as an ear bud. As an example, the housing 620 can include a push-push mechanism such that application of force to the surface 1317 of the ear bud 1310 actuates the push-push mechanism to push the ear bud 1310 outwardly such that a user can manipulate the ear bud 1310. For example, consider a movable socket that can receive at least part of the speaker portion 1315 where the socket moves inwardly to responsive to force applied to the surface 1317 to actuate a push-push mechanism that ejects the ear bud 1310 at least partially out of the tray 1320. As an example, a push-push mechanism may include one or more features of the push-push mechanism of FIG. 11A and FIG. 11B (see, e.g., portions 729, 769-1, 769-2).

As an example, the housing 620 can include an eject button. For example, consider a button proximate to the opening 627 in the surface 625 where depression of the button causes a member to apply force to the ear bud 1310 to move it outwardly from the tray 1320.

As an example, a device can include one or more instances of the tray 1320, for example, consider a left side tray and a right side tray where, for example, one or more speaker grilles may be disposed at least in part therebetween. As an example, a device can include a plurality of trays disposed in one or more tray recesses. For example, consider the example of FIG. 2, which shows some examples of tray recesses 301, 302, 303 and 304. As an example, where a device is a tablet device, for example, a device with a single housing that is a display housing, such a device can include one or more tray recesses.

As an example, a mechanism may be operatively coupled to a hinge assembly such that one or more ear buds are moved responsive to rotation of one housing with respect to another housing using the hinge assembly. For example, the housings 620 and 640 and the hinge assembly 630 can form a housing assembly with the multiple housings 620 and 640 operatively coupled via the hinge assembly 630. In such an example, upon rotating the housing 640 to an open position with respect to the housing 620, a mechanism may move the ear bud 1310 and/or the tray 1320 such that the surface 1317 moves upwardly away from the surface 625 of the housing 620. For example, consider a rack with pinions where one pinion is coupled to the hinge assembly 630 and another pinion is coupled to the tray 1320 and/or the ear bud 1310. In such an example, consider one of the pinions (e.g., tray side) having a cam shape such that rotation of the pinion causes a larger radius perimeter to engage the tray 1320 and/or the ear bud 1310 to push it outwardly from the recess 670. FIG. 13C shows an example of a mechanism 1390 that includes a gear that can be part of or operatively coupled to the hinge assembly 630 (see also, e.g., the hinge assembly 132 of FIG. 1), which may be a dual axle hinge assembly, and another cam gear where a rack or other part or parts operatively coupled to the gear and the cam gear. As shown, rotation of the gear can cause translation of the rack such that the cam gear rotates to push an ear bud or a tray (e.g., the ear bud 1310 or the tray 1320) outwardly from an upper surface (e.g., the surface 625). While gears are shown, as an example, one or more friction components (e.g., friction wheel(s), friction sliders, etc.) may be utilized (e.g., additionally or alternatively). As an example, while in a moved position, an ear bud may be in contact electrically with circuitry of the housing 620 and/or may be chargeable using wireless charging circuitry. For example, the ear bud may be in a "presented" position while being chargeable. As an example, the surface 1317 of the ear bud 1310 may be a surface of material that is compatible with the display 644 such that, if contact occurs, the surface 1317 does not damage the display 644. As an example, where contact occurs, for example, upon closing the housing 640, the contact may be sufficient to push the ear bud 1310 (or tray 1320) downwardly (e.g., to a stored position).

Figure 14:
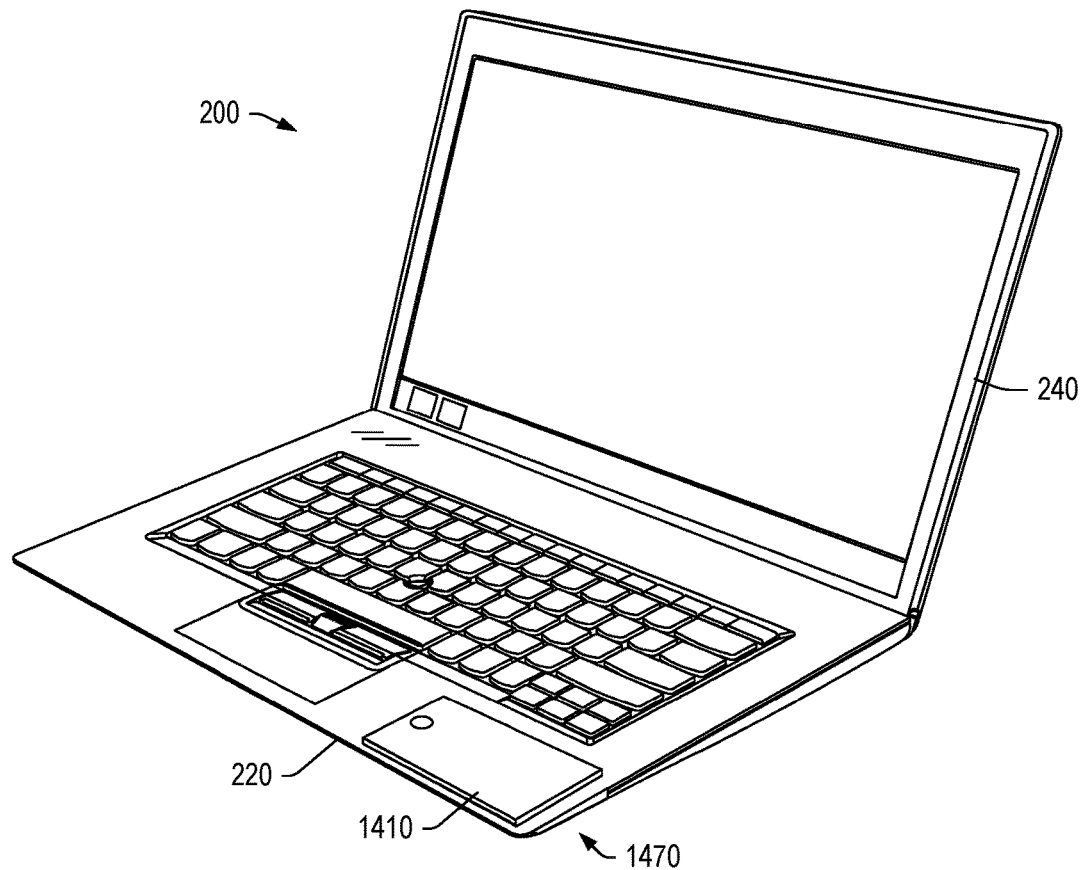
FIG. 14 is a series of diagrams of an example of a device with an example of a component.
Figure 14:
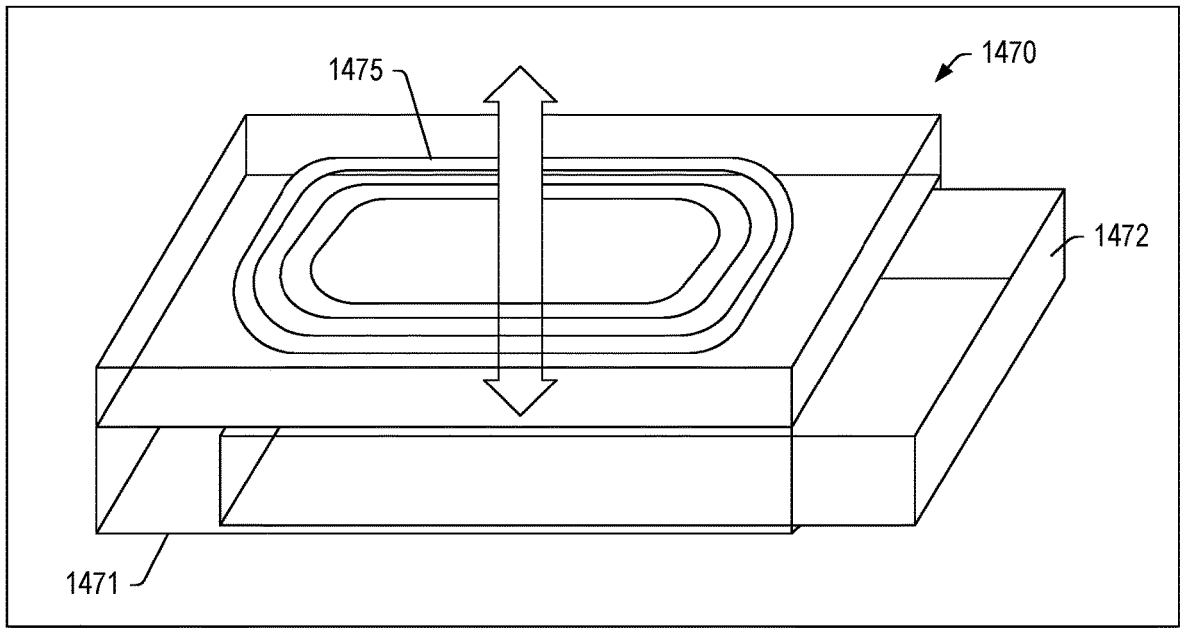

FIG. 14 shows an example of the device 200 along with a mobile device 1410 and a component 1470. As shown in the example of FIG. 14, the component 1470 can include a chassis 1471, a tray 1472, and an antenna 1475. In the example of FIG. 14, the antenna 1475 can be operatively coupled to charging circuitry for wireless charging of a rechargeable battery, etc. In the example of FIG. 14, the antenna 1475 can be configured for bi-directional wireless charging. For example, the antenna 1475 can wirelessly charge a rechargeable battery disposed in the tray 1472 and/or the mobile device 1410 as disposed on a surface of the housing 220 of the device 200.

Figure 15:
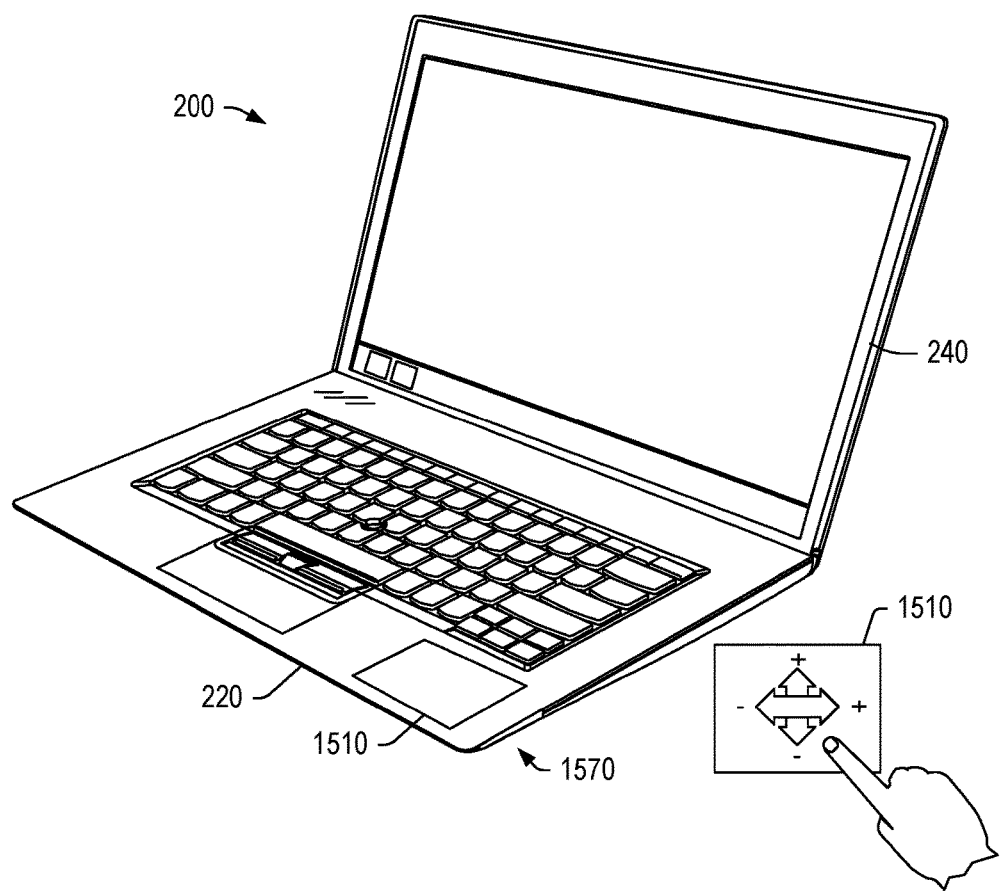
FIG. 15 is a series of diagrams of an example of a device with an example of a component.
Figure 15:
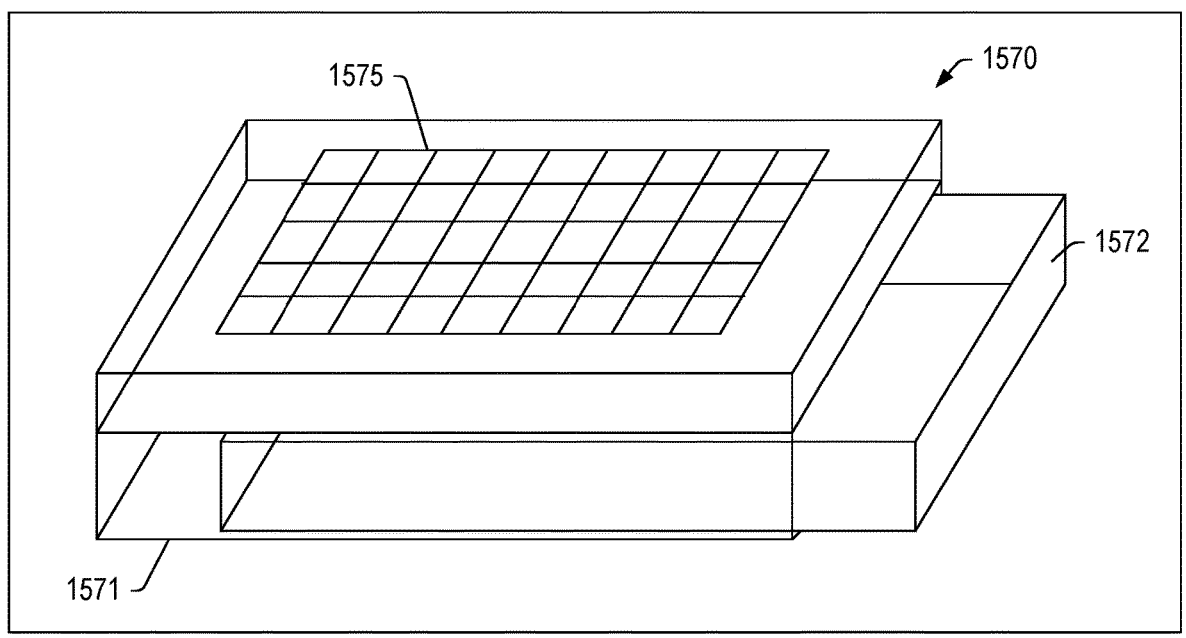

FIG. 15 shows an example of the device 200 along with a touch sensitive surface 1510 and a component 1570. As shown in the example of FIG. 15, the component 1570 can include a chassis 1571, a tray 1572, and a touch sensing circuitry 1575. In the example of FIG. 15, the touch sensing circuitry 1575 can include capacitive, resistive, and/or other touch sensing circuitry. As an example, the touch sensing circuitry 1575 may be operatively coupled to audio circuitry and/or wireless communication circuitry such that a user may utilize touch (e.g., single finger, multi-finger, etc.) such that circuitry of the device 200 receives signals that can be utilized as commands to instruction operations such as, for example, volume control, forward, reverse, etc. As an example, a cover such as the cover 1277 of the example of FIG. 12A may include one or more types of circuitry such as, for example, wireless charging circuitry, touch sensing circuitry, etc. For example, the cover 1277 can include an antenna and/or capacitive and/or resistive touch sensing circuitry (e.g., an array that can detect touch input, etc.).

As an example, the touch sensing circuitry 1575 may provide for one or more of double tap to play or pause, swipe right for next track, swipe left for previous track, swipe right and hold to fast-forward with release at a desired playback point, swipe left and hold to fast-reverse with release at a desired playback point, swipe toward the keyboard to increase volume, swipe away from the keyboard to decrease volume, cancel an outgoing call, receive an incoming call, finish an ongoing call, speak-to-chat, etc. As an example, the touch sensing circuitry 1575 can include and/or be operatively coupled to palm rejection circuitry and/or other touch rejection circuitry. For example, where the area of the surface 1510 is utilized as a palm rest, the touch sensing circuitry 1575 may sense a palm area and reject it (e.g., ignore it as input). In such an example, the touch sensing circuitry 1575 may receive single fingertip input and/or various multiple fingertip input.

As an example, the device 200 can include circuitry that can render one or more graphical user interfaces that can be controlled using the touch sensing circuitry 1575. As an example, the touch sensing circuitry 1575 may be removable with the component 1570 such that it may be utilized when the component 1570 is physically separated from the device 200. For example, consider an ability to control rendering of audio via ear buds using the touch sensing circuitry 1575 when the component 1570 is physically separated from the device 200 where the ear buds may be wirelessly coupled to circuitry of the device 200 and/or another device.

As an example, one ear bud may be coupled wirelessly to one device and another ear bud may be coupled wirelessly to another device. In such an example, multiple channels may be utilized and/or a left channel and right channel may be managed differently such that audio circuitry directs certain audio signals to one ear bud and directs certain audio signals to another ear bud.

FIG. 16A shows an example of a component 1610 that includes one or more light emitting diodes (LEDs), which can include one or more LEDs that emits radiation in the ultra-violet portion of the electromagnetic spectrum. For example, consider a UV LED that can be triggered to turn on for a particular length of time upon closing of a tray where the tray may or may not include one or more items. For example, if no items are in the tray, the UV LED may emit radiation that can help to sterilize the tray and, if one or more items are in the tray, the UV LED may emit radiation that can help to sterilize at least one of the one or more items. For example, consider an ear bud that is to be positioned in an ear of a user where it may collect one or more types of biological material. In such an example, upon storage of the ear bud in the tray and closing of the tray, the UV LED may illuminate for a period of time (e.g., of the order of seconds) to expose the ear bud to sanitizing radiation, which may include one or more of UVA, UVB and UVC, noting that UVC has shown to provide for inactivation of various viruses.

FIG. 16B shows an example of a component 1620 that includes a biometric reader. For example, consider a fingerprint reader, an iris reader, etc. In such an example, a housing of a device can include a window or opening where that allows for use of the biometric reader when stored in the housing of the device. As an example, when the component 1620 is removed from the housing of the device, the device may be secured such that logon is not possible or, for example, a limited access logon is possible. In such an example, a user can be assured that the device is relatively secure. As an example, the component 1620 may be an active dongle, which may include, for example, a trusted platform module (TPM) (see, e.g., ISO/IEC 11889). A TPM can conform to an international standard for a secure cryptoprocessor that is a dedicated microcontroller designed to secure hardware through integrated cryptographic keys. A TPM can include a hardware random number generator and features for secure generation of cryptographic keys, hashes, data encryption, etc. As an example, the component 1620 can include a serial port (e.g., a serial bus connector, etc.) that may be utilized to electronically couple circuitry of the component 1620 in a physically coupled state to a housing of a device and/or that may be utilized to electronically couple circuitry of the component 1620 to a different device, etc. As an example, the component 1620 may include a rechargeable battery.

As an example, the component 1620 may be utilized for one or more tasks that involve one or more security protocols. For example, the component 1620 may be utilized for encryption of data of multiple, different devices, for logon to multiple different device, for booting an operating system of multiple different devices, etc. For example, the component 1620 may be nested in a recess of one device yet operable via a cable connection to one or more other devices.

FIG. 16C shows an example of a component 1630 that includes a camera, which may be a wireless camera that can operate via a wireless connection when physically separated from a device or attached to a device without being in a recess of a housing of the device where the recess is to accommodate the component 1630. As an example, the camera may include a magnet such that it can be positioned on a bezel of a display housing of a device.

FIG. 16D shows an example of a component 1640 that includes removable circuitry. For example, consider a solid-state drive (SSD) as a type of memory device that is removable. In such an example, the SSD may be stored in a coupled orientation or an uncoupled orientation, for example, depending on whether a connector is facing inwardly or outwardly. In such an example, a user may desire storage of the SSD without having an ability to write to the SSD and, where the user desires writing and/or reading of the SSD, the user may reverse its orientation such that a connector can be physically coupled to a connector to a housing of a device when the SSD is in a recess of the housing that accommodates the component 1640. As an example, a SSD connector may be suitable for use by one or more other devices and/or suitable for use via a cable. For example, consider using the SSD with another device that does not include a suitable recess but that includes a port that can be connected to a connector of the SSD via a cable.

While various examples of FIG. 16A, FIG. 16B, FIG. 16C and FIG. 16D show translating trays, as explained, a tray may be fixed. As an example, a tray may be molded as an integral part of a portion of a housing. For example, consider the example of FIG. 13B where the tray 1320 may be molded at least in part as a feature of the surface 625 (e.g., a shell surface, etc.), the assembly 221 of FIG. 3, etc. In such an example, the surface, as mentioned, may also include one or more openings such as the speaker grille 680, a keyboard bezel, etc.

As an example, a device can include a processor; memory accessible to the processor; a housing assembly that includes a display and a tray recess; and a tray disposed in the tray recess. In such an example, the tray can be a tray for one or more types of circuitry. For example, consider ear buds that include various types of circuitry.

As explained, ear buds tend to be relatively small, which can make them difficult to find if misplaced, forgotten, etc. As an example, a tray can be a convenient place for storage. And, when the tray is receivable by a housing of a device, one or more features of the device may be utilized for one or more purposes (e.g., communication, charging, locating, etc.).

As mentioned, communication and/or charging may be via wired and/or wireless technology. As to locating, consider an electronic leash where, if an accelerometer of the device indicates that the device is moving while ear buds are not in a tray, a signal may be issued to locate the ear buds where the signal may gradually become louder if it is an audio signal.

As an example, a locating signal may cause illumination of an ear bud if an ear bud includes one or more light emitting parts (e.g., one or more LEDs, etc.). As explained, an ear bud can include an accelerometer where if a device senses that it is moving and the ear buds communicate a movement signal indicating that they are also moving, then the device may determine that the ear buds are moving with the device and/or with a person that is carrying the device. As an example, an ear bud accelerometer signal may be compared to a device accelerometer signal to determine if an ear bud or ear buds are in a tray disposed in a recess of a housing of a device. In such an example, if a sufficient match does not exist, the device and/or one or more of the ear buds may determine that they are separate from the device. Such logic may optionally be utilized for one or more purposes, which can include issuing of one or more signals, etc. (e.g., locating signal, etc.).

As an example, where a device includes charging circuitry for one or more items receivable by a tray, the one or more items may be relatively assured of being in a charged state. For example, if the device is a laptop computer that is often plugged into an electrical power outlet, whether in use or not, the device may be in a low power state where a portion of power from the electrical power outlet and/or a battery of the device is operatively coupled to charging circuitry of the one or more items received in the tray (e.g., or trays).

As explained, a tray can be associated with circuitry such as touch sensing circuitry such that one or more controls are available via the touch sensing circuitry that may control one or more operations of one or more items that can be received by the tray, whether the one or more items are in the tray or not. As explained, for ear buds, touch sensing circuitry may provide for control of audio signals (e.g., volume, tracks, navigation, etc.), which may or may not involve rendering of one or more graphical user interfaces to a display of the device. Where various types of touch input are relatively intuitive, a user may interact with audio circuitry using touch sensing circuitry without disturbing content rendered to a display.

As an example, where a device includes wireless charging circuitry, such circuitry may be multi-directional such that it can charge a mobile device positioned on a surface of a housing and/or charge one or more items received in a tray that is disposed in a recess of the housing. For example, consider ear buds where the ear buds may be charged using the wireless charging circuitry, removed from the tray, inserted into ears of a user and utilized for listening to audio generated by one or more of the device and/or the mobile device, which may be receiving power via the charging circuitry.

As explained, one or more ear bud speakers may have multiple uses. For example, when disposed in a tray in a recess of a housing, an ear bud may function as a speaker, optionally in combination with one or more fixed speakers. In such an example, a tray may be positioned proximate to an opening of a housing such that acoustic waves can emanate from the housing. In such an example, a tray may be shaped to orient a speaker of an ear bud in a particular direction such that it is aimed at the opening and/or an acoustic chamber that is in fluid communication with the opening. As an example, an acoustic chamber may act to amplify sound emitted by a speaker of an ear bud.

As an example, a tray may be akin to a Japanese bento box, where one or more cavities (e.g., one or more bays, etc.) can be utilized to store one or more electronic items.

As explained, a device can include a tray that can receive wireless earphones for storage and charging where the tray may be an extendible drawer located on a side of the device, which may be a laptop computer (e.g., a laptop computing device). In such an example, the earphones can be readily accessible when needed. For example, a touch with force can cause extension of the drawer as a spring assisted drawer where the earphones are stored and charged, as appropriate, which may be when not in use. As explained, where the earphones serve as a speaker or speakers, they may optionally be powered via a power source of the device (e.g., via a USB port, etc.). As an example, a device can include circuitry that allows for monitoring battery life and/or changing one or more earphone settings, which may be directly from the device via appropriate circuitry. As explained, a device and/or a component may include touch sensing circuitry that may facilitate control of one or more electronic items that can be removably stored in a tray in a recess of a housing of a device.

As an example, a device can include a processor; memory accessible to the processor; a housing assembly that includes a display and a tray recess; and an ear bud tray disposed in the tray recess. In such an example, the housing assembly can include at least one housing. For example, consider a tablet housing, a housing that can be utilized for a foldable (e.g., bendable) display, a keyboard housing and a display housing coupled via a hinge assembly, an all-in-one (AIO) housing, etc. In such examples, one or more housings can include a tray recess or tray recesses.

As an example, a device can include at least one ear bud receivable by an ear bud tray. As an example, a device can include two ear bud trays and two ear buds where each of the two ear bud trays can receive one of the ear buds. For example, as shown in FIGS. 13B and 13C, a device can include one or more single ear bud trays.

As an example, a device can include a chassis that defines at least a portion of a tray recess. In such an example, the chassis may be part of a component that can receive a tray, which may be a fixed tray or a movable and/or a removable tray.

As an example, a device can include detection circuitry that generates an ear bud detection signal. For example, consider detection circuitry that includes charging circuitry, serial bus circuitry (e.g., serial bus hub, etc.), an antenna, etc. As an example, a device can include wireless communication circuitry that responds to an ear bud detection signal. For example, consider circuitry that can detect movement of an ear bud with respect to an ear bud tray and/or a tray recess such that, upon detection of movement or lack thereof, wireless circuitry can pair and/or un-pair with an ear bud or ear buds. As an example, an ear bud may be a master ear bud and another ear bud may be a slave ear bud where communication with the master controls communication with the slave ear bud.

As an example, a device can include wireless communication circuitry, audio circuitry operatively coupled to the wireless communication circuitry and at least one ear bud that includes wireless communication circuitry.

As an example, a device can include charging circuitry disposed adjacent to a tray recess. For example, consider charging circuitry that includes at least one electrical contact and/or at least one antenna. As explained, a cover may include one or more of charging circuitry and touch sensing circuitry and/or one or more other types of circuitry.

As an example, a housing assembly can include a first housing and a second housing coupled via a hinge assembly. In such an example, the first housing can be or include a display housing for a display and the second housing can include a keyboard. As mentioned, one or more housings may include one or more recesses, which can be or include one or more tray recesses.

As an example, a housing assembly can be a tablet housing that includes a display and one or more tray recesses. As an example, a tablet housing may include a shell that forms a back side of a tablet computing device and a display that forms at least a portion of a front side of the tablet computing device. In such an example, the back side, a front side and/or an edge may include an opening, which may be a tray opening. As an example, a tray recess may be defined in part by one or more of a display and a shell.

As an example, a method can include, in a device that includes a processor, memory accessible to the processor, a housing assembly that includes a display and a tray recess, charging circuitry, wireless communication circuitry, an ear bud tray disposed in the tray recess, and an ear bud, electronically detecting a change in position of the ear bud; and, responsive to the change, controlling the wireless communication circuitry with respect to the ear bud. For example, consider electronically detecting a change in position of the ear bud by detecting an open circuit between the charging circuitry and the ear bud and/or electronically detecting a change in position of the ear bud by detecting a closed circuit between the charging circuitry and the ear bud. As an example, a method can include electronically detecting a change in position of an ear bud responsive to a change in position of an ear bud tray with respect to a tray recess.

As an example, a method can include controlling wireless communication circuitry with respect to an ear bud via establishing a wireless connection between wireless communication circuitry and an ear bud (or ear buds).

As an example, a device can include touch sensing circuitry for a surface of a housing assembly. For example, consider a surface that is disposed adjacent to a tray recess. As mentioned, a cover for a tray or tray recess may include one or more types of circuitry, where such circuitry may include touch sensing circuitry.

As an example, an ear bud tray may be translatable with respect to a tray recess. For example, consider an ear bud tray that can translate inwardly and outwardly via features of the ear bud tray and mating features of a tray recess, which may be or include one or more features of a chassis.

As an example, an ear bud tray may be rotatable with respect to a tray recess. For example, consider an ear bud tray that rotates out of a tray recess. In such an example, an axle may be positioned at or proximate to a corner of the ear bud tray such that the ear bud tray is rotatable via an axis defined by the axle (e.g., consider a swing out ear bud tray). As an example, an axle may be along an edge or side of an ear bud tray such that the ear bud tray is rotatable by an axis defined by the axle (e.g., consider a swing up ear bud tray).

As an example, a device can include at least one UV emitter such as a UV LED. In such an example, the UV emitter may be triggered by closing of a tray via a cover, moving into a recess, etc. As an example, a UV emitter may be triggered by positioning of an ear bud in an ear bud tray (see, e.g., the example of FIG. 13B and FIG. 13C, etc.).

As an example, a device can include a processor; memory accessible to the processor; a housing assembly that includes a display and a tray recess; a tray disposed in the tray recess; and one or more electronic items receivable by the tray, where at least one of the one or more electronic items includes a rechargeable battery. In such an example, the one or more electronic items can be or include an ear bud, ear buds, memory, biometric reader circuitry, cryptography circuitry, a camera, etc.

The term "circuit" or "circuitry" is used in the summary, description, and/or claims. As is well known in the art, the term "circuitry" includes all levels of available integration (e.g., from discrete logic circuits to the highest level of circuit integration such as VLSI, and includes programmable logic components programmed to perform the functions of an embodiment as well as general-purpose or special-purpose processors programmed with instructions to perform those functions) that includes at least one physical component such as at least one piece of hardware. A processor can be circuitry. Memory can be circuitry. Circuitry may be processor-based, processor accessible, operatively coupled to a processor, etc. Circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 17:
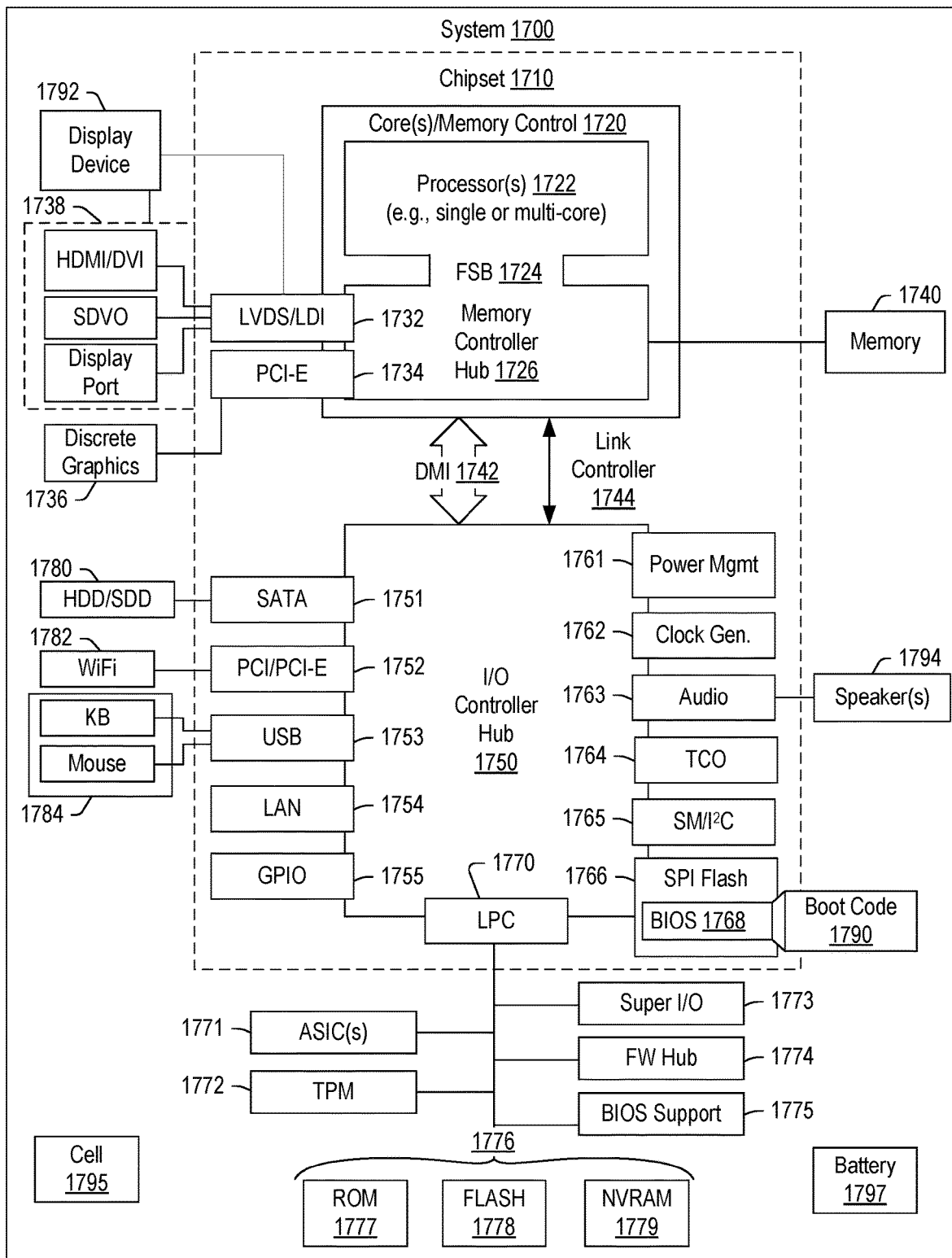
FIG. 17 is a diagram of an example of a system that includes one or more processors.

While various examples of circuits or circuitry have been discussed, FIG. 17 depicts a block diagram of an illustrative computer system 1700. The system 1700 may be part of a computing device, such as, for example, one of the THINKCENTRE® or THINKPAD® series of personal computers sold by Lenovo (US) Inc. of Morrisville, N.C., or a workstation computer, such as the THINKSTATION®, which are sold by Lenovo (US) Inc. of Morrisville, N.C.; however, as apparent from the description herein, a display device or other machine may include other features or only some of the features of the system 1700.

As an example, a computing device may include features, such as, for example, one or more of the features included in one of the LENOVO® IDEACENTRE® or THINKCENTRE® "all-in-one" (AIO) computing devices (e.g., sold by Lenovo (US) Inc. of Morrisville, N.C.). For example, the LENOVO® IDEACENTRE® A720 computing device includes an Intel® Core i7 processor, a 27 inch frameless multi-touch display (e.g., for HD resolution of 1920×1080), a NVIDIA® GeForce® GT 630M 2 GB graphics card, 8 GB DDR3 memory, a hard drive, a DVD reader/writer, integrated Bluetooth® and 802.11b/g/n Wi-Fi®, USB connectors, a 6-in-1 card reader, a webcam, HDMI in/out, speakers, and a TV tuner. As an example, an AIO computing device can include a housing assembly that includes one or more recesses that can receive a tray where, for example, the tray can removably receive one or more electronic items.

As shown in FIG. 17, the system 1700 includes a so-called chipset 1710. A chipset refers to a group of integrated circuits, or chips, that are designed (e.g., configured) to work together. Chipsets are usually marketed as a single product (e.g., consider chipsets marketed under the brands INTEL®, AMD®, etc.). As an example, the device 100 of FIG. 1, the device 200 of FIG. 2, etc., can include one or more features of the system 1700 of FIG. 17.

In the example of FIG. 17, the chipset 1710 has a particular architecture, which may vary to some extent depending on brand or manufacturer. The architecture of the chipset 1710 includes a core and memory control group 1720 and an I/O controller hub 1750 that exchange information (e.g., data, signals, commands, etc.) via, for example, a direct management interface or direct media interface (DMI) 1742 or a link controller 1744. In the example of FIG. 17, the DMI 1742 is a chip-to-chip interface (sometimes referred to as being a link between a "northbridge" and a "southbridge").

The core and memory control group 1720 include one or more processors 1722 (e.g., single core or multi-core) and a memory controller hub 1726 that exchange information via a front side bus (FSB) 1724. As described herein, various components of the core and memory control group 1720 may be integrated onto a single processor die, for example, to make a chip that supplants the conventional "northbridge" style architecture.

The memory controller hub 1726 interfaces with memory 1740. For example, the memory controller hub 1726 may provide support for DDR SDRAM memory (e.g., DDR, DDR2, DDR3, etc.). In general, the memory 1740 is a type of random-access memory (RAM). It is often referred to as "system memory".

The memory controller hub 1726 further includes a low-voltage differential signaling interface (LVDS) 1732. The LVDS 1732 may be a so-called LVDS Display Interface (LDI) for support of a display device 1792 (e.g., a CRT, a flat panel, a projector, etc.). A block 1738 includes some examples of technologies that may be supported via the LVDS interface 1732 (e.g., serial digital video, HDMI/DVI, display port). The memory controller hub 1726 also includes one or more PCI-express interfaces (PCI-E) 1734, for example, for support of discrete graphics 1736. Discrete graphics using a PCI-E interface has become an alternative approach to an accelerated graphics port (AGP). For example, the memory controller hub 1726 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1750 includes a variety of interfaces. The example of FIG. 17 includes a SATA interface 1751, one or more PCI-E interfaces 1752 (optionally one or more legacy PCI interfaces), one or more USB interfaces 1753, a LAN interface 1754 (more generally a network interface), a general purpose I/O interface (GPIO) 1755, a low-pin count (LPC) interface 1770, a power management interface 1761, a clock generator interface 1762, an audio interface 1763 (e.g., for speakers 1794), a total cost of operation (TCO) interface 1764, a system management bus interface (e.g., a multi-master serial computer bus interface) 1765, and a serial peripheral flash memory/controller interface (SPI Flash) 1766, which, in the example of FIG. 17, includes BIOS 1768 and boot code 1790. With respect to network connections, the I/O hub controller 1750 may include integrated gigabit Ethernet controller lines multiplexed with a PCI-E interface port. Other network features may operate independent of a PCI-E interface.

The interfaces of the I/O hub controller 1750 provide for communication with various devices, networks, etc. For example, the SATA interface 1751 provides for reading, writing or reading and writing information on one or more drives 1780 such as HDDs, SDDs or a combination thereof. The I/O hub controller 1750 may also include an advanced host controller interface (AHCI) to support one or more drives 1780. The PCI-E interface 1752 allows for wireless connections 1782 to devices, networks, etc. The USB interface 1753 provides for input devices 1784 such as keyboards (KB), one or more optical sensors, mice and various other devices (e.g., microphones, cameras, phones, storage, media players, etc.). On or more other types of sensors may optionally rely on the USB interface 1753 or another interface (e.g., I²C, etc.). As to microphones, the system 1700 of FIG. 17 may include hardware (e.g., audio card) appropriately configured for receipt of sound (e.g., user voice, ambient sound, etc.).

In the example of FIG. 17, the LPC interface 1770 provides for use of one or more ASICs 1771, a trusted platform module (TPM) 1772, a super I/O 1773, a firmware hub 1774, BIOS support 1775 as well as various types of memory 1776 such as ROM 1777, Flash 1778, and non-volatile RAM (NVRAM) 1779. With respect to the TPM 1772, this module may be in the form of a chip that can be used to authenticate software and hardware devices. For example, a TPM may be capable of performing platform authentication and may be used to verify that a system seeking access is the expected system.

The system 1700, upon power on, may be configured to execute boot code 1790 for the BIOS 1768, as stored within the SPI Flash 1766, and thereafter processes data under the control of one or more operating systems and application software (e.g., stored in system memory 1740). An operating system may be stored in any of a variety of locations and accessed, for example, according to instructions of the BIOS 1768. Again, as described herein, a satellite, a base, a server or other machine may include fewer or more features than shown in the system 1700 of FIG. 17. Further, the system 1700 of FIG. 17 is shown as optionally include cell phone circuitry 1795, which may include GSM, CDMA, etc., types of circuitry configured for coordinated operation with one or more of the other features of the system 1700. Also shown in FIG. 17 is battery circuitry 1797, which may provide one or more battery, power, etc., associated features (e.g., optionally to instruct one or more other components of the system 1700). As an example, a SMBus may be operable via a LPC (see, e.g., the LPC interface 1770), via an I²C interface (see, e.g., the SM/I²C interface 1765), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A method comprising:
   in a device that comprises a processor, memory accessible to the processor, a housing assembly that comprises a display and a tray recess, charging circuitry, wireless communication circuitry, an ear bud tray disposed in the tray recess, and an ear bud, electronically detecting a change in position of the ear bud; and
   responsive to the change, controlling the wireless communication circuitry with respect to the ear bud.

2. The method of claim 1, wherein the electronically detecting a change in position of the ear bud comprises detecting an open circuit between the charging circuitry and the ear bud.

3. The method of claim 1, wherein the electronically detecting a change in position of the ear bud comprises detecting a closed circuit between the charging circuitry and the ear bud.

4. The method of claim 1, wherein the electronically detecting a change in position of the ear bud is responsive to a change in position of the ear bud tray with respect to the tray recess.

5. The method of claim 1, wherein the controlling the wireless communication circuitry with respect to the ear bud comprises establishing a wireless connection between the wireless communication circuitry and the ear bud.

6. A device comprising:
a processor;
memory accessible to the processor;
a housing assembly that comprises a display and a tray recess;
charging circuitry;
wireless communication circuitry;
an ear bud tray disposed in the tray recess;
an ear bud; and
detection circuitry that electronically detects a change in position of the ear bud wherein, responsive to the change, the processor controls the wireless communication circuitry with respect to the ear bud.

7. The device of claim 6, wherein the detection circuitry electronically detects the change in position of the ear bud by detection of an open circuit between the charging circuitry and the ear bud.

8. The device of claim 6, wherein the detection circuitry electronically detects the change in position of the ear bud by detection of a closed circuit between the charging circuitry and the ear bud.

9. The device of claim 6, wherein the detection circuitry electronically detects the change in position of the ear bud responsive to a change in position of the ear bud tray with respect to the tray recess.

10. The device of claim 6, wherein the control of the wireless communication circuitry with respect to the ear bud comprises establishing a wireless connection between the wireless communication circuitry and the ear bud.

11. The device of claim 6, wherein the housing assembly comprises a first housing and a second housing coupled via a hinge assembly.

12. The device of claim 11, wherein the first housing comprises a display housing for the display and wherein the second housing comprises a keyboard and the tray recess.

13. The device of claim 6, wherein the housing assembly comprises a tablet housing that comprises the display and the tray recess.

\* \* \* \* \*